(12) United States Patent
Smith et al.

(10) Patent No.: US 11,546,761 B2
(45) Date of Patent: Jan. 3, 2023

(54) ACCESS CONTROL IN AN OBSERVE-NOTIFY NETWORK USING CALLBACK

(71) Applicant: Intel Corporation, Santa Clara, CA (US)

(72) Inventors: Ned M. Smith, Beaverton, OR (US); Nathan Heldt-Sheller, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 380 days.

(21) Appl. No.: 16/609,697

(22) PCT Filed: May 8, 2018

(86) PCT No.: PCT/US2018/031650
§ 371 (c)(1),
(2) Date: Oct. 30, 2019

(87) PCT Pub. No.: WO2018/208818
PCT Pub. Date: Nov. 15, 2018

(65) Prior Publication Data
US 2020/0067926 A1    Feb. 27, 2020

Related U.S. Application Data

(60) Provisional application No. 62/503,804, filed on May 9, 2017.

(51) Int. Cl.
*H04L 29/06* (2006.01)
*G06F 9/50* (2006.01)
(Continued)

(52) U.S. Cl.
CPC .......... *H04W 12/08* (2013.01); *G06F 9/5022* (2013.01); *H04L 63/101* (2013.01); *H04L 63/20* (2013.01); *G06F 2209/503* (2013.01)

(58) Field of Classification Search
CPC .................. H04W 12/08; G06F 9/5022; G06F 2209/503; H04L 63/101; H04L 63/20
See application file for complete search history.

(56) References Cited

U.S. PATENT DOCUMENTS 10,484,382 B2 *  11/2019  Wilson ................ H04L 63/0815
11,157,338 B2 *  10/2021  Rodean ................... G06F 9/546
(Continued)

FOREIGN PATENT DOCUMENTS

| WO | WO-2014116152 A1 * | 7/2014 | .......... H04W 12/125 |
|---|---|---|---|
| WO | WO-2014116152 A1 | 7/2014 | |
| WO | WO-2018208818 A1 | 11/2018 | |

OTHER PUBLICATIONS

"International Application Serial No. PCT US2018 031650, International Preliminary Report on Patentability dated Nov. 21, 2019", 7 pgs.

(Continued)

*Primary Examiner* — Yonas A Bayou
(74) *Attorney, Agent, or Firm* — Schwegman Lundberg & Woessner, P.A.

(57) ABSTRACT

Various systems and methods for implementing observe-notify callback context automation in a connected device framework are described herein. In an example, the techniques for context automation may include: expansion of RESTful permissions to include an OBSERVE command (e.g., as part of a CRUDON (Create, Retrieve, Update, Delete, Observe, Notify) command definition); configuration of a callback resource to implement the OBSERVE command; access control policies to implement the OBSERVE command; and OBSERVE registration events to be monitored within an access management service.

25 Claims, 8 Drawing Sheets

(51) Int. Cl.
*H04W 12/08* (2021.01)
*H04L 9/40* (2022.01)

(56) References Cited

U.S. PATENT DOCUMENTS

| | | | |
|---|---|---|---|
| 11,258,786 B2* | 2/2022 | Bansal | G06Q 20/3821 |
| 11,258,797 B2* | 2/2022 | Wilson | G06F 16/951 |
| 2007/0277228 A1* | 11/2007 | Curtis | H04L 63/0884 |
| | | | 726/4 |
| 2011/0213870 A1* | 9/2011 | Cai | H04L 67/10 |
| | | | 709/223 |
| 2012/0072597 A1* | 3/2012 | Teather | H04L 47/70 |
| | | | 709/226 |
| 2012/0304245 A1* | 11/2012 | Lawson | H04L 63/20 |
| | | | 709/227 |
| 2013/0304788 A1* | 11/2013 | DeLuca | G06F 8/61 |
| | | | 709/201 |
| 2014/0075029 A1* | 3/2014 | Lipchuk | G06F 9/5077 |
| | | | 709/226 |
| 2015/0245205 A1* | 8/2015 | Kim | H04L 63/08 |
| | | | 726/4 |
| 2016/0014038 A1* | 1/2016 | Thyagarajan | G06F 9/5077 |
| | | | 709/226 |
| 2016/0112475 A1* | 4/2016 | Lawson | H04L 65/80 |
| | | | 709/204 |

OTHER PUBLICATIONS

"International Application Serial No. PCT/US2018/031650, International Search Report dated Aug. 2, 2018", 4 pgs.

"International Application Serial No. PCT/US2018/031650, Written Opinion dated Aug. 2, 2018", 7 pgs.

* cited by examiner

ACCESS CONTROL IN AN OBSERVE-NOTIFY NETWORK USING CALLBACK

PRIORITY CLAIM

This application is a U.S. National Stage Application under 35 U.S.C. 371 from International Application No. PCT/US2018/031650, filed May 8, 2017, published as WO 2018/208818, which claims the benefit of priority to U.S. Application Ser. No. 62/503,804, filed May 9, 2017, all of which are incorporated herein by reference in their entirety.

TECHNICAL FIELD

Embodiments described herein generally relate to processing techniques used with data communications and interconnected device networks, and in particular, to techniques applied within internet of things (IoT) devices and device networks.

BACKGROUND

IoT devices are physical or virtualized objects that may communicate on a network, and may include sensors, actuators, and other input/output components, such as to collect data or perform actions from a real world environment. For example, IoT devices may include low-powered devices that are embedded or attached to everyday things, such as buildings, vehicles, packages, etc., to provide an additional level of artificial sensory perception of those things. Recently, IoT devices have become more popular and thus applications using these devices have proliferated.

Various standards have been proposed to more effectively interconnect and operate IoT devices and IoT network use cases. These include the specialization of communication standards distributed by groups such as Institute of Electrical and Electronics Engineers (IEEE), and the specialization of application interaction architecture and configuration standards distributed by groups such as the Open Connectivity Foundation (OCF).

BRIEF DESCRIPTION OF THE DRAWINGS

In the drawings, which are not necessarily drawn to scale, like numerals may describe similar components in different views. Like numerals having different letter suffixes may represent different instances of similar components. Some embodiments are illustrated by way of example, and not limitation, in the figures of the accompanying drawings in which.

DETAILED DESCRIPTION

Figure 1:
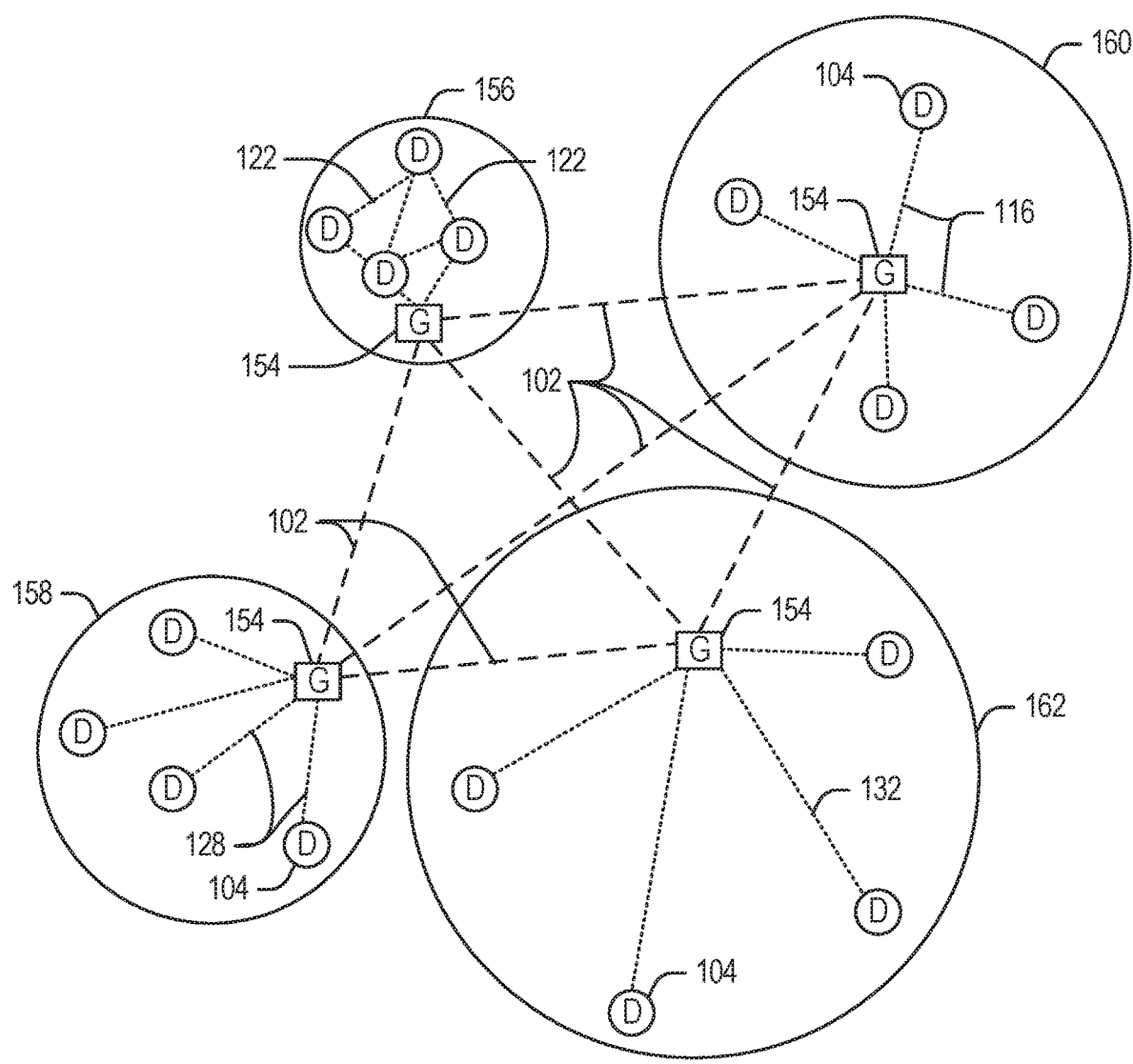
FIG. 1 illustrates a domain topology for respective internet-of-things (IoT) networks coupled through links to respective gateways, according to an example.

The systems and methods described herein may operate in an Internet of Things (IoT) architecture or other interconnected network. As an example, the interconnected network may be facilitated using an interconnect specification released by the Open Connectivity Foundation™ (OCF). In an OCF system, multiple providers and solutions may share a physical hardware platform. A platform may host multiple physical or virtual devices. Devices are addressable endpoints of communication, and run the OCF software stack. A device may host multiple physical or virtual resources. A resource may represent a sensor or an actuator.

In the following description, methods, configurations, and related apparatuses are disclosed in an example for the creation of an OBSERVE command in a RESTful architecture, and accompanying configurations and operations to allow communications between an observer and a resource in a device communication framework.

With existing approaches in device communication frameworks that involve RESTful communications, an observer device may be able to register with another device (a notifier device). This notifier device then notifies the observer device when an event or action condition becomes true (e.g., an update to a resource). During the waiting period between observer registration and notification callback, the session context can be lost. This loss of context may be caused because RESTful context is stateless, or because non-RESTful context is cleaned up by either side as part of resource management strategies.

A further complication exists with existing approaches when a notifier device attempts to deliver a notification to an observer device. The access model may have overlooked provisioning of access control list (ACL) and credential resources necessary to originate a connection in the reverse direction from observe registration. Normally, an observer requires RETRIEVE authorization to read the resource being observed. An access policy normally relies on the current session context to discover the calling device (or resource) such that the ACL policy's 'subject' is unambiguously matched to the session caller. However, when the session context goes away, the ACL policy is ambiguous as the subject matching criteria does not unambiguously capture the identity of the observer. The techniques and implementations discussed herein address these and other configuration limitations found in existing approaches.

Systems and methods disclosed herein are used to perform an optionally asymmetric technique for notifying an observer of changes to a resource, while maintaining security controls. For example, a notifier device (e.g., acting as a server or maintaining a resource) may notify an observer device (e.g., acting as a client device to the server) of a change to a resource. The notifier device may verify that the observer device has sufficient credentials to be notified of the change, such as by checking an access control list (ACL) policy, which may be maintained on the notifier device or remotely (e.g., from an Access Management Service (AMS)). Similarly, the observer device may verify that the notifier device is credentialed to send an update for the resource to the observer device by checking an ACL or using another security measure (e.g., a key). The notifier device may keep a list of observer devices for sending the update. The observer device may keep a list of notifier devices for receiving updates. The observer device may instantiate a callback resource to mirror or track the resource for changes and updates.

FIG. 1 illustrates an example domain topology for respective internet-of-things (IoT) networks coupled through links to respective gateways. The internet of things (IoT) is a concept in which a large number of computing devices are interconnected to each other and to the Internet to provide functionality and data acquisition at very low levels. Thus, as used herein, an IoT device may include a semiautonomous device performing a function, such as sensing or control, among others, in communication with other IoT devices and a wider network, such as the Internet.

Often, IoT devices are limited in memory, size, or functionality, allowing larger numbers to be deployed for a similar cost to smaller numbers of larger devices. However, an IoT device may be a smart phone, laptop, tablet, or PC, or other larger device. Further, an IoT device may be a virtual device, such as an application on a smart phone or other computing device. IoT devices may include IoT gateways, used to couple IoT devices to other IoT devices and to cloud applications, for data storage, process control, and the like.

Networks of IoT devices may include commercial and home automation devices, such as water distribution systems, electric power distribution systems, pipeline control systems, plant control systems, light switches, thermostats, locks, cameras, alarms, motion sensors, and the like. The IoT devices may be accessible through remote computers, servers, and other systems, for example, to control systems or access data.

Figure 2:
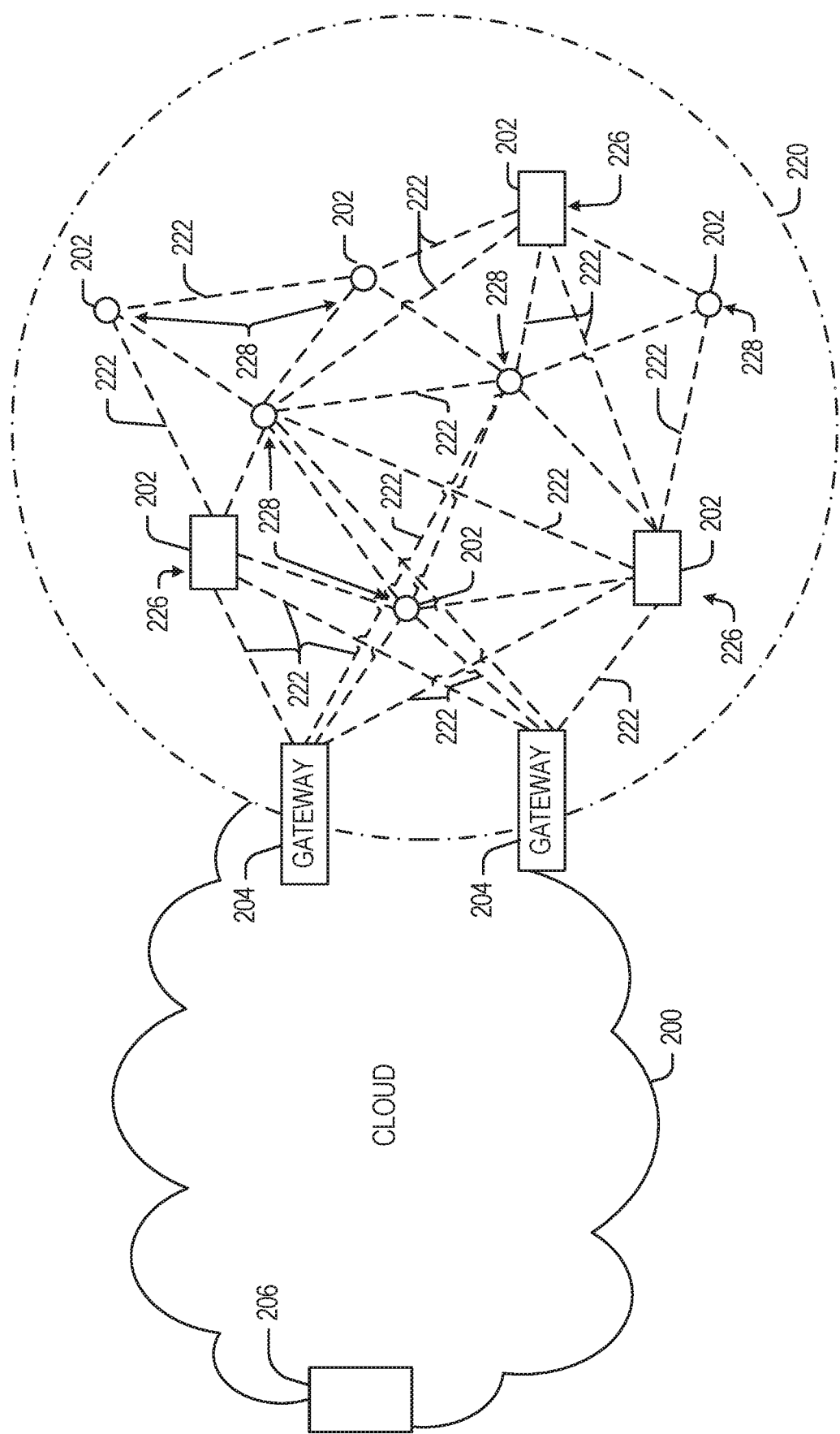
FIG. 2 illustrates a cloud computing network in communication with a mesh network of IoT devices operating as a fog device at the edge of the cloud computing network, according to an example.

The future growth of the Internet and like networks may involve very large numbers of IoT devices. Accordingly, in the context of the techniques discussed herein, a number of innovations for such future networking will address the need for all these layers to grow unhindered, to discover and make accessible connected resources, and to support the ability to hide and compartmentalize connected resources. Any number of network protocols and communications standards may be used, wherein each protocol and standard is designed to address specific objectives. Further, the protocols are part of the fabric supporting human accessible services that operate regardless of location, time or space. The innovations include service delivery and associated infrastructure, such as hardware and software; security enhancements; and the provision of services based on Quality of Service (QoS) terms specified in service level and service delivery agreements. As will be understood, the use of IoT devices and networks, such as those introduced in FIGS. 1 and 2, present a number of new challenges in a heterogeneous network of connectivity comprising a combination of wired and wireless technologies.

FIG. 1 specifically provides a simplified drawing of a domain topology that may be used for a number of internet-of-things (IoT) networks comprising IoT devices 104, with the IoT networks 156, 158, 160, 162, coupled through backbone links 102 to respective gateways 154. For example, a number of IoT devices 104 may communicate with a gateway 154, and with each other through the gateway 154. To simplify the drawing, not every IoT device 104, or communications link (e.g., link 116, 122, 128, or 132) is labeled. The backbone links 102 may include any number of wired or wireless technologies, including optical networks, and may be part of a local area network (LAN), a wide area network (WAN), or the Internet. Additionally, such communication links facilitate optical signal paths among both IoT devices 104 and gateways 154, including the use of MUXing/deMUXing components that facilitate interconnection of the various devices.

The network topology may include any number of types of IoT networks, such as a mesh network provided with the network 156 using Bluetooth low energy (BLE) links 122. Other types of IoT networks that may be present include a wireless local area network (WLAN) network 158 used to communicate with IoT devices 104 through IEEE 802.11 (Wi-Fi®) links 128, a cellular network 160 used to communicate with IoT devices 104 through an LTE/LTE-A (4G) or 5G cellular network, and a low-power wide area (LPWA) network 162, for example, a LPWA network compatible with the LoRaWan specification promulgated by the LoRa alliance, or a IPv6 over Low Power Wide-Area Networks (LPWAN) network compatible with a specification promulgated by the Internet Engineering Task Force (IETF). Further, the respective IoT networks may communicate with an outside network provider (e.g., a tier 2 or tier 3 provider) using any number of communications links, such as an LTE cellular link, an LPWA link, or a link based on the IEEE 802.15.4 standard, such as Zigbee®. The respective IoT networks may also operate with use of a variety of network and internet application protocols such as Constrained Application Protocol (CoAP). The respective IoT networks may also be integrated with coordinator devices that provide a chain of links that forms cluster tree of linked devices and networks.

Each of these IoT networks may provide opportunities for new technical features, such as those as described herein. The improved technologies and networks may enable the exponential growth of devices and networks, including the use of IoT networks into as fog devices or systems. As the use of such improved technologies grows, the IoT networks may be developed for self-management, functional evolution, and collaboration, without needing direct human intervention. The improved technologies may even enable IoT networks to function without centralized controlled systems. Accordingly, the improved technologies described herein may be used to automate and enhance network management and operation functions far beyond current implementations.

In an example, communications between IoT devices 104, such as over the backbone links 102, may be protected by a decentralized system for authentication, authorization, and accounting (AAA). In a decentralized AAA system, distributed payment, credit, audit, authorization, and authentication systems may be implemented across interconnected heterogeneous network infrastructure. This allows systems and networks to move towards autonomous operations. In these types of autonomous operations, machines may even contract for human resources and negotiate partnerships with other machine networks. This may allow the achievement of mutual objectives and balanced service delivery against outlined, planned service level agreements as well as achieve solutions that provide metering, measurements, traceability, and trackability. The creation of new supply chain structures and methods may enable a multitude of services to be created, mined for value, and collapsed without any human involvement.

Such IoT networks may be further enhanced by the integration of sensing technologies, such as sound, light, electronic traffic, facial and pattern recognition, smell, vibration, into the autonomous organizations among the IoT devices. The integration of sensory systems may allow systematic and autonomous communication and coordination of service delivery against contractual service objectives, orchestration and quality of service (QoS) based swarming and fusion of resources. Some of the individual examples of network-based resource processing include the following.

The mesh network 156, for instance, may be enhanced by systems that perform inline data-to-information transforms. For example, self-forming chains of processing resources comprising a multi-link network may distribute the transformation of raw data to information in an efficient manner, and the ability to differentiate between assets and resources and the associated management of each. Furthermore, the proper components of infrastructure and resource based trust and service indices may be inserted to improve the data integrity, quality, assurance and deliver a metric of data confidence.

The WLAN network 158, for instance, may use systems that perform standards conversion to provide multi-standard connectivity, enabling IoT devices 104 using different protocols to communicate. Further systems may provide seamless interconnectivity across a multi-standard infrastructure comprising visible Internet resources and hidden Internet resources.

Communications in the cellular network 160, for instance, may be enhanced by systems that offload data, extend communications to more remote devices, or both. The LPWA network 162 may include systems that perform non-Internet protocol (IP) to IP interconnections, addressing, and routing. Further, each of the IoT devices 104 may include the appropriate transceiver for wide area communications with that device. Further, each IoT device 104 may include other transceivers for communications using additional protocols and frequencies. This is discussed further with respect to the communication environment and hardware of an IoT processing device depicted in FIGS. 6 and 7.

Finally, clusters of IoT devices may be equipped to communicate with other IoT devices as well as with a cloud network. This may allow the IoT devices to form an ad-hoc network between the devices, allowing them to function as a single device, which may be termed a fog device. This configuration is discussed further with respect to FIG. 2.

FIG. 2 illustrates a cloud computing network in communication with a mesh network of IoT devices (devices 202) operating as a fog device at the edge of the cloud computing network. The mesh network of IoT devices may be termed a fog 220, operating at the edge of the cloud 200. To simplify the diagram, not every IoT device 202 is labeled.

The fog 220 may be considered to be a massively interconnected network wherein a number of IoT devices 202 are in communications with each other, for example, by radio links 222. As an example, this interconnected network may be facilitated using an interconnect specification released by the OCF. This standard allows devices to discover each other and establish communications for interconnects. Other interconnection protocols may also be used, including, for example, the optimized link state routing (OLSR) Protocol, the better approach to mobile ad-hoc networking (B.A.T-.M.A.N.) routing protocol, or the OMA Lightweight M2M (LWM2M) protocol, among others.

Three types of IoT devices 202 are shown in this example, gateways 204, data aggregators 226, and sensors 228, although any combinations of IoT devices 202 and functionality may be used. The gateways 204 may be edge devices that provide communications between the cloud 200 and the fog 220, and may also provide the backend process function for data obtained from sensors 228, such as motion data, flow data, temperature data, and the like. The data aggregators 226 may collect data from any number of the sensors 228, and perform the back end processing function for the analysis. The results, raw data, or both may be passed along to the cloud 200 through the gateways 204. The sensors 228 may be full IoT devices 202, for example, capable of both collecting data and processing the data. In some cases, the sensors 228 may be more limited in functionality, for example, collecting the data and allowing the data aggregators 226 or gateways 204 to process the data.

Communications from any IoT device 202 may be passed along a convenient path between any of the IoT devices 202 to reach the gateways 204. In these networks, the number of interconnections provide substantial redundancy, allowing communications to be maintained, even with the loss of a number of IoT devices 202. Further, the use of a mesh network may allow IoT devices 202 that are very low power or located at a distance from infrastructure to be used, as the range to connect to another IoT device 202 may be much less than the range to connect to the gateways 204.

The fog 220 provided from these IoT devices 202 may be presented to devices in the cloud 200, such as a server 206, as a single device located at the edge of the cloud 200, e.g., a fog device. In this example, the alerts coming from the fog device may be sent without being identified as coming from a specific IoT device 202 within the fog 220. In this fashion, the fog 220 may be considered a distributed platform that provides computing and storage resources to perform processing or data-intensive tasks such as data analytics, data aggregation, and machine-learning, among others.

In some examples, the IoT devices 202 may be configured using an imperative programming style, e.g., with each IoT device 202 having a specific function and communication partners. However, the IoT devices 202 forming the fog device may be configured in a declarative programming style, allowing the IoT devices 202 to reconfigure their operations and communications, such as to determine needed resources in response to conditions, queries, and device failures. As an example, a query from a user located at a server 206 about the operations of a subset of equipment monitored by the IoT devices 202 may result in the fog 220 device selecting the IoT devices 202, such as particular sensors 228, needed to answer the query. The data from these sensors 228 may then be aggregated and analyzed by any combination of the sensors 228, data aggregators 226, or gateways 204, before being sent on by the fog 220 device to the server 206 to answer the query. In this example, IoT devices 202 in the fog 220 may select the sensors 228 used based on the query, such as adding data from flow sensors or temperature sensors. Further, if some of the IoT devices 202 are not operational, other IoT devices 202 in the fog 220 device may provide analogous data, if available.

Various techniques for improving operational integrity of an IoT device in a connected device framework are described in the following sections with reference to FIGS. 3 to 11. Specifically, some of the device framework and terminology discussed in the following examples is provided within specifications defined by the OCF family of standards (e.g., the OCF Specification 1.0 and later versions). However, it will be understood that the following techniques may be applicable to other specifications and families of standards, in addition to proprietary and non-standard implementations.

In an OCF architecture, entities in the real physical world (e.g., a temperature sensor) are represented as resources. Interactions with entities are implemented through resource representations, which use operations that adhere to Representational State Transfer (REST) architectures, e.g., RESTful interactions. As such, entities are exposed as resources, each with their unique identifiers (URIs) and support interfaces that enable RESTful operations on their resources. A client initiates a RESTful operation on a server. The client is the initiator and the server is a responder. Any device may act as a client to initiate a RESTful operation or any other device acting as a server. Thus, the role of a device as a client or server, in many circumstances, may be interchangeable. Any device that exposes a resource is by definition, a server. Each RESTful operation contains all of the information needed to understand the context of the operation and is supported by a set of generic operations (e.g., CREATE, RETRIEVE, UPDATE, DELETE, and NOTIFY (CRUDN)).

As discussed herein, the following techniques may be implemented in connection with use of various OCF services, including DOXS (also known as DOTS, Device Owner Transfer Service). In a further example, the following techniques may be implemented in connection with an onboarding tool (OBT). In the context of an OCF implementation, an OBT is an logical entity within a specific IoT network that establishes ownership for a specific device and helps bring the device into operational state within that network. For instance, a typical OBT may implement DOXS, AMS (Access Management Service), and CMS (Credential Management Service) functionality.

The following discussion provides an overview of IoT network implementations and techniques for implementing callback context automation (e.g., observe-notify implemented using RESTful commands). Specifically, some of the device framework and terminology discussed in the following examples is provided with reference to specifications defined by the OCF family of standards (e.g., the OCF Specification 1.0 and later versions). However, it will be understood that the following techniques may be applicable to other specifications and families of standards, in addition to proprietary and non-standard implementations.

Some existing IoT network implementations such as DDS, Alljoyn, and DCE rely on a virtual private network (VPN) context that is common across all nodes in the network or device fog. However, a VPN-based context approach treats all participants (peers) with equivalent trust such that the direction of information flow is not central to the trust model.

In contrast, in IoT frameworks such as OCF, messages are RESTful (stateless) and directional. In other words, the flow (A→B) has different security semantics than (B→A); whereas with VPN-based solutions (A←→B) is the same as (B←→A). Further, a VPN-based security model diminishes directionality semantics that have beneficial safety properties. Consequently, safety goals may be diminished with some existing IoT network implementations in an attempt to satisfy security goals.

The techniques discussed and illustrated herein for observer-notify callback context automation address these and other technical limitations.

In an example, RESTful permissions or commands may be expanded to include OBSERVE in addition to RETRIEVE and NOTIFY. The OBSERVE command may be used at an observer device to request notification of an update to a resource from a notifier device. In another example, a CREATE command may be used instead of OBSERVE, such as by using a read to obtain information at an observer device from a notifier device. The NOTIFY command may be used to provide updated access policies from an AMS or to notify an observer device of an update to a resource from a notifier device.

A new type of resource called a callback resource may be used (e.g., at an observer device), to allow observation communications in a callback between an observer device and a notifier device. Registration of OBSERVE (or a read) on a resource of the notifier device may result in creation of the callback resource on the observer device. When the notification is delivered, for example using an UPDATE command of a restful messaging system such as CoAP or HTTP, the update may be applied to the callback resource at the observer device.

The observer device may access control policies, for example using the callback resource to reference the NOTIFY permission rather than the UPDATE permission. Using the access control policies, the observer device may verify that the notifier device is credentialed to notify the observer device of a change to a resource.

An OBSERVE registration event may be observed by an AMS that considers the resources involved in the registration and subsequent notification. The AMS may provision the access policy that allows the flow from the notifier device to the observer device.

In an example, the techniques discussed herein allow the RESTful directional messaging semantics to be preserved where the ACL access enforcement reinforces directionality. Also in an example, an AMS can be used to dynamically provision an ACL policy that is specific to the OBSERVE-NOTIFY interaction semantic. Also in an example, devices on either side of the OBSERVE-NOTIFY pattern can apply local resource management strategies without leaving zombie resources.

Figure 3:
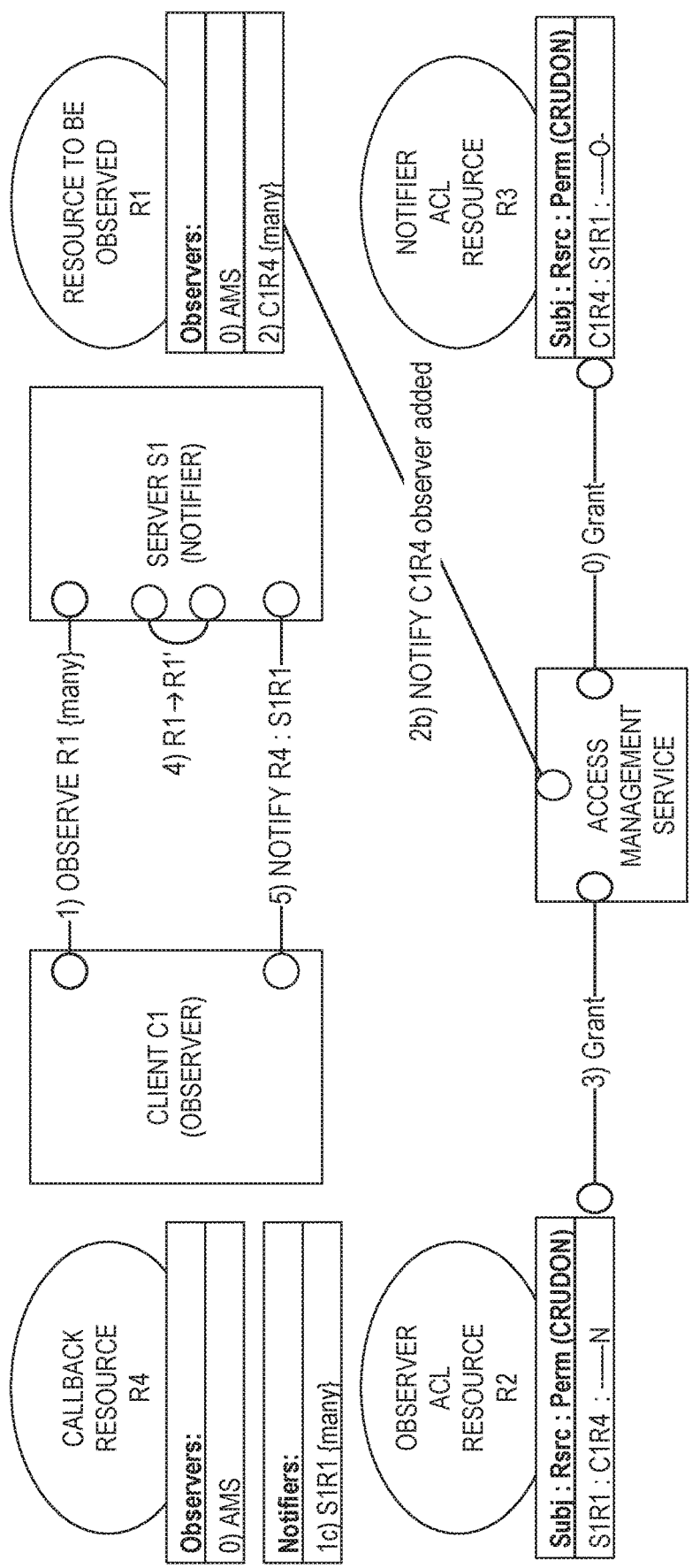
FIG. 3 illustrates an operational flow diagram for an OBSERVE-NOTIFY pattern with automated access policy provisioning according to an example.

FIG. 3 illustrates an operational flow diagram for an OBSERVE-NOTIFY pattern with automated access policy provisioning according to an example. In an example, the integration of this OBSERVE-NOTIFY command may be provided as an addition to a CRUDN (Create, Retrieve. Update, Delete, Notify) command definition, allowing a new CRUDON (Create, Retrieve, Update, Delete, Observe, Notify) command definition.

The operational flow diagram 300 of FIG. 3 includes illustrations of the following operations.

The Access Management Service (AMS) is optionally registered as an observer of both the Callback resource R4 and the Resource to be Observed (by C1, the observer or client device) so that changes to the Observers and Notifiers properties of these resources will inform the AMS. The AMS may maintain a list (which may be subject to security, such as access by a key) of observers or notifiers.

At a starting state, the AMS has granted R1 resource with OBSERVE permissions to C1R4. Granting the R1 resource may be performed by the AMS in response to a trigger that introduced C1 into the system as an entity that is authorized as an observer on S1 (the notifier device or server).

The observer device C1 determines it is appropriate to register and OBSERVE with S1R1. The Secure Resource Manager (SRM) in S1 evaluates the ACL policy in R3 and finds C1R1 is authorized to perform OBSERVE. In an example, the SRM may access an ACL policy by querying the AMS.

C1 may add S1 to its list of Notifiers. S1 may add C1R4 as an observer. OBSERVE may be registered with a single or many observed events. This example shows {many}. For example, S1 may notify one or more observer for a resource during an update notification. C1 may have one or more notifier devices on a list, such as for different resources.

In an example, AMS may learn of the new observer on R1 and determines that it is acceptable to allow S1R1 to send notification messages to C1R4. For example, AMS may respond to a query from S1 to evaluate whether C1 may receive notifications for the resource. AMS may grant S1R1 access to C1R4 by updating the C1 ACL resource accordingly.

When S1 realizes an event that modifies a property in R1 resulting in R1', S1 may notify C1 (or any other observers on a list). S1 informs its observers of the change to R1 which includes C1R4. The notification message may be sent as an UPDATE command to the Callback resource R4 originating from S1R1. In an example, S1 may determine whether C1 is still allowed to receive the update by accessing the ACL policy (e.g., by querying the AMS).

In an example, the S1 SRM finds a credential suitable for opening a session between S1 and C1, and creates a secure session over which the UPDATE command is delivered. In an example, the C1 SRM verifies that S1R1 is authorized to NOTIFY C1R4 by checking the ACL policy. In an example, S1 verifying that C1 may receive the update and C1 verifying that S1 may send the update may be separate operations, which may use different credentials (e.g., a key), wherein the security between devices C1 and S1 are directionally dependent.

In an example, the credential ID of the Observer (C1) is stored in S1's Notifier list as part of the observe registration. If the credential type is a symmetric key, a reference to the symmetric key is added so that the key will not disappear should it be deleted for some other purpose before the NOTIFY is delivered. Furthermore, if the key is scheduled to expire, the expiration can be chosen that extends the current expiration enabling the NOTIFY to occur after normal use expiry. This allows S1 to connect to C1 using the same security that C1 connected to S1, but with restrictions on its use for NOTIFY. In the asymmetric case, S1 references the AMS using the public key (and an S1 identity or role) to ask AMS to provision a second credential authorizing S1 to connect to C1 following the NOTIFY path back to C1. This allows NOTIFY to be asynchronous with respect to OBSERVE without expectation that S1 has a 'regular' credential relationship with C1 where S1 might otherwise violate a 'server' role by initiating a 'client' connection to C1.

C1 may have determined that it no longer wishes to observe S1R1. It may remove the S1R1 entry from its Observers property. The next time S1R1 delivers a notification message C1 returns NO_SUCH_NOTIFIER in response to the notification resulting in S1 removing C1R4 as an observer.

In an example, {1} is specified as the notification cardinality, C1R4 is removed after the 1 notification message is delivered. C1 likewise removes S1R1 from the Notifiers list after the first notification message.

S1 may wish to prematurely cancel the C1 registration by removing the entry from the Observers list. It may inform C1 of the cancellation by sending a notification message that updates the cardinality to {0}—indicating no more notifications are anticipated.

In other examples, the operations and functionality described above with reference to FIG. 3 may be embodied by a IoT device machine in the example form of an electronic processing system, within which a set or sequence of instructions may be executed to cause the electronic processing system to perform any one of the methodologies discussed herein, according to an example embodiment. The machine may be an IoT device or an IoT gateway, including a machine embodied by aspects of a personal computer (PC), a tablet PC, a personal digital assistant (PDA), a mobile telephone or smartphone, or any machine capable of executing instructions (sequential or otherwise) that specify actions to be taken by that machine. Further, while only a single machine may be depicted and referenced in the example above, such machine shall also be taken to include any collection of machines that individually or jointly execute a set (or multiple sets) of instructions to perform any one or more of the methodologies discussed herein. Further, these and like examples to a processor-based system shall be taken to include any set of one or more machines that are controlled by or operated by a processor (e.g., a computer) to individually or jointly execute instructions to perform any one or more of the methodologies discussed herein.

Figure 4:
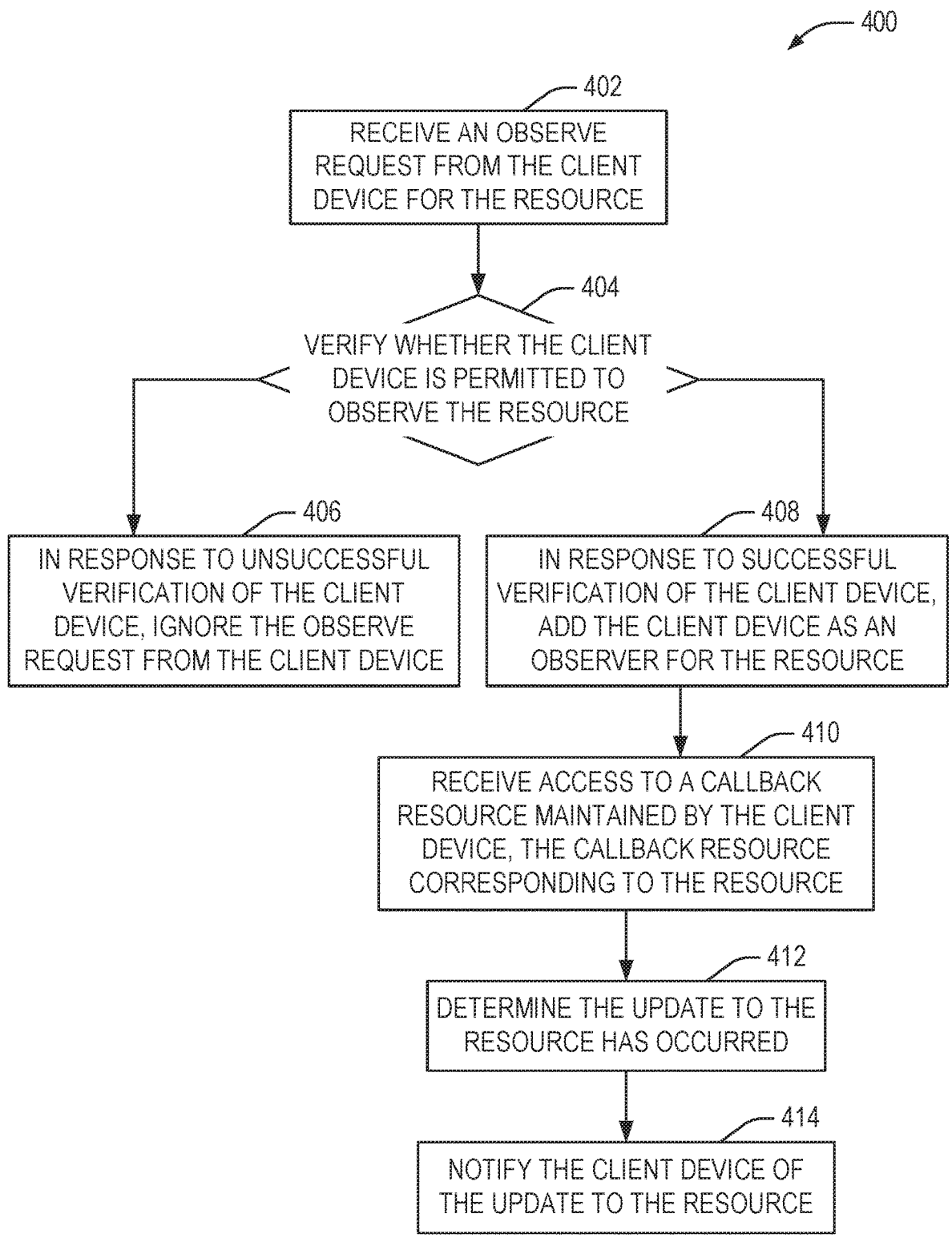
FIG. 4 illustrates a flowchart showing a technique for notifying a client device of an update to a resource, according to an example.

FIG. 4 illustrates a flowchart showing a technique 400 for notifying a client device of an update to a resource, according to an example. The technique 400 includes an operation 402 to receive an observe request from the client device for the resource. In an example, the observe request includes an OBSERVE command implemented as part of a set of RESTful commands. The resource may represent a sensor or an actuator.

The technique 400 includes a decision operation 404 to verify whether the client device is permitted to observe the resource. Operation 404 may include using a secure resource manager to evaluate an access control list (ACL) policy. Operation 404 may include requesting access information from an Access Management Service (AMS). The device used to perform operations 402 and 404 may be an OCF device acting as a server to the client device. In an example, the AMS may operate within an OCF onboarding tool or within an OCF generalized client.

The technique 400 includes an operation 406 to in response to unsuccessful verification of the client device, ignore the observe request from the client device. The technique 400 includes an operation 408 to in response to successful verification of the client device, add the client device as an observer for the resource. The technique 400 includes an operation 410 to receive access to a callback resource maintained by the client device, the callback resource corresponding to the resource. The technique 400 includes an operation 412 to determine the update to the resource has occurred.

The technique 400 includes an operation 414 to notify the client device of the update to the resource. Operation 414 may include notifying the client device over a secure session established between the device (performing operation 414) and the client device. Operation 414 may include sending a RESTful UPDATE command or a RESTful NOTIFY command. In an example, before notifying the client device, the technique 400 may include re-verifying that the client device is permitted to observe the resource.

The technique 400 may include receiving a response from the client device indicating that the device is not in a list of notifiers at the client device in response to the notification of the update. In an example, the client device may be removed from a list of observers of the resource, for example in response to receiving the response.

Figure 5:
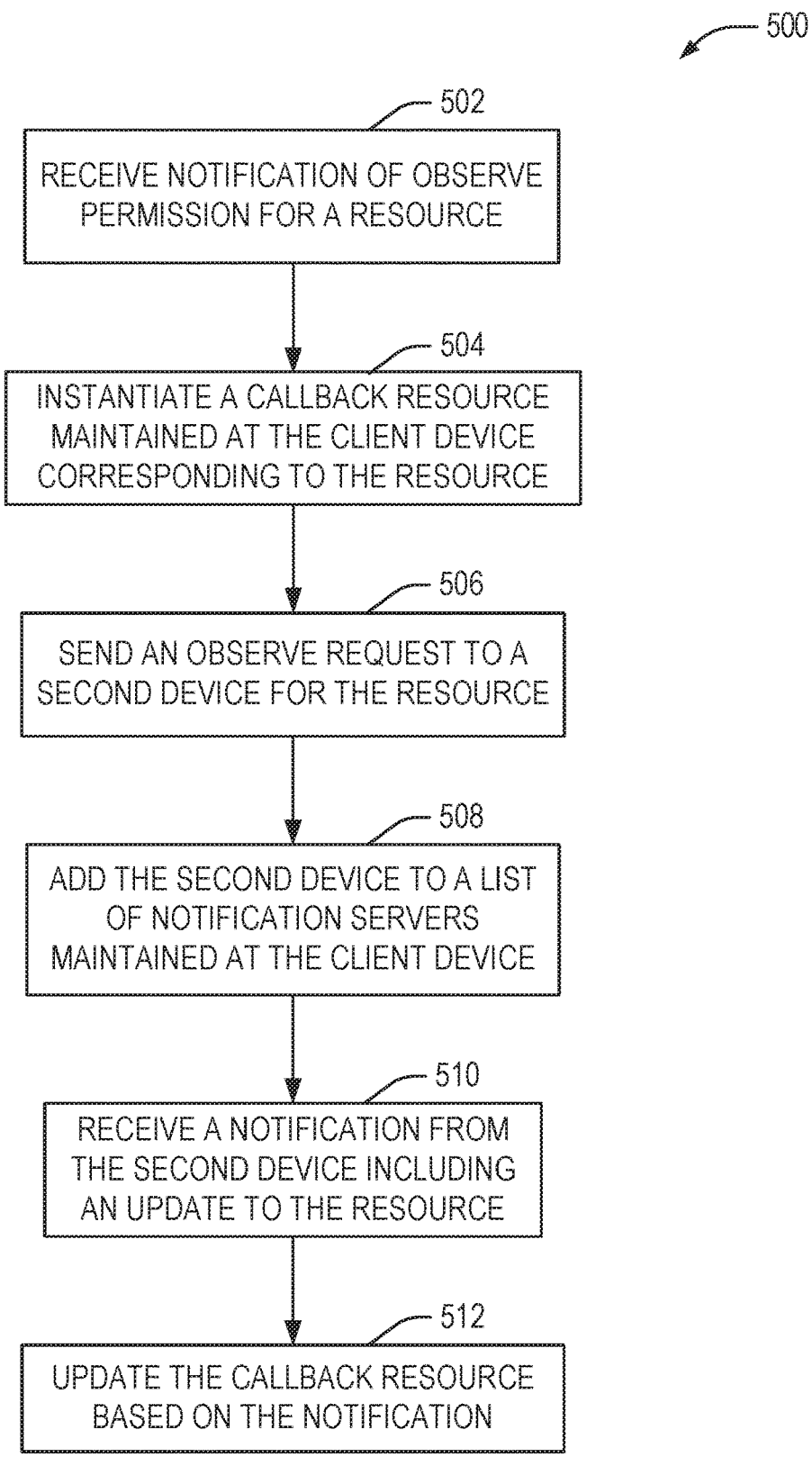
FIG. 5 illustrates a flowchart showing a technique for tracking a resource using a callback resource at a client device, according to an example.

FIG. 5 illustrates a flowchart showing a technique 500 for tracking a resource using a callback resource at a client device, according to an example. The technique 500 includes an operation 502 to receive notification of observe permission for a resource. Operation 502 may include receiving the notification over a secure session established between the second device and the client device. The notification may include a RESTful UPDATE command or a RESTful NOTIFY command. The resource may the resource represent a sensor or an actuator.

The technique 500 includes an operation 504 to instantiate a callback resource maintained at the client device corresponding to the resource. The technique 500 includes an operation 506 to send an observe request to a second device for the resource. In an example, the observe request includes an OBSERVE command implemented as part of a set of RESTful commands.

The technique 500 includes an operation 508 to add the second device to a list of notification servers maintained at the client device. The technique 500 includes an operation 510 to receive a notification from the second device including an update to the resource. The technique 500 includes an operation 512 to update the callback resource based on the notification.

The technique 500 may include verifying that the second device is authorized to notify the client device of the update to the resource before updating the callback resource. For example, the second device may be verified by using a secure resource manager to evaluate an access control list (ACL) policy. In an example, verifying that the second device is authorized to notify the client device of the update to the resource includes requesting access information from an AMS. In an example, the second device is an OCF) device acting as a server to the client device and the AMS operates within an OCF onboarding tool or within an OCF generalized client.

The technique 500 may include releasing the callback resource. The technique 500 may include removing the second device from the list of notification servers. The technique 500 may include receiving a second notification from the second device including a second update to the resource. The technique 500 may include sending a response to the second device indicating that the second device is not in a list of notifiers at the client device in response to the second notification.

In other examples, the operations and functionality described above with reference to FIGS. 3 to 5 may be embodied by a IoT device machine in the example form of an electronic processing system, within which a set or sequence of instructions may be executed to cause the electronic processing system to perform any one of the methodologies discussed herein, according to an example embodiment. The machine may be an IoT device or an IoT gateway, including a machine embodied by aspects of a personal computer (PC), a tablet PC, a personal digital assistant (PDA), a mobile telephone or smartphone, or any machine capable of executing instructions (sequential or otherwise) that specify actions to be taken by that machine. Further, while only a single machine may be depicted and referenced in the example above, such machine shall also be taken to include any collection of machines that individually or jointly execute a set (or multiple sets) of instructions to perform any one or more of the methodologies discussed herein. Further, these and like examples to a processor-based system shall be taken to include any set of one or more machines that are controlled by or operated by a processor (e.g., a computer) to individually or jointly execute instructions to perform any one or more of the methodologies discussed herein.

Figure 6:
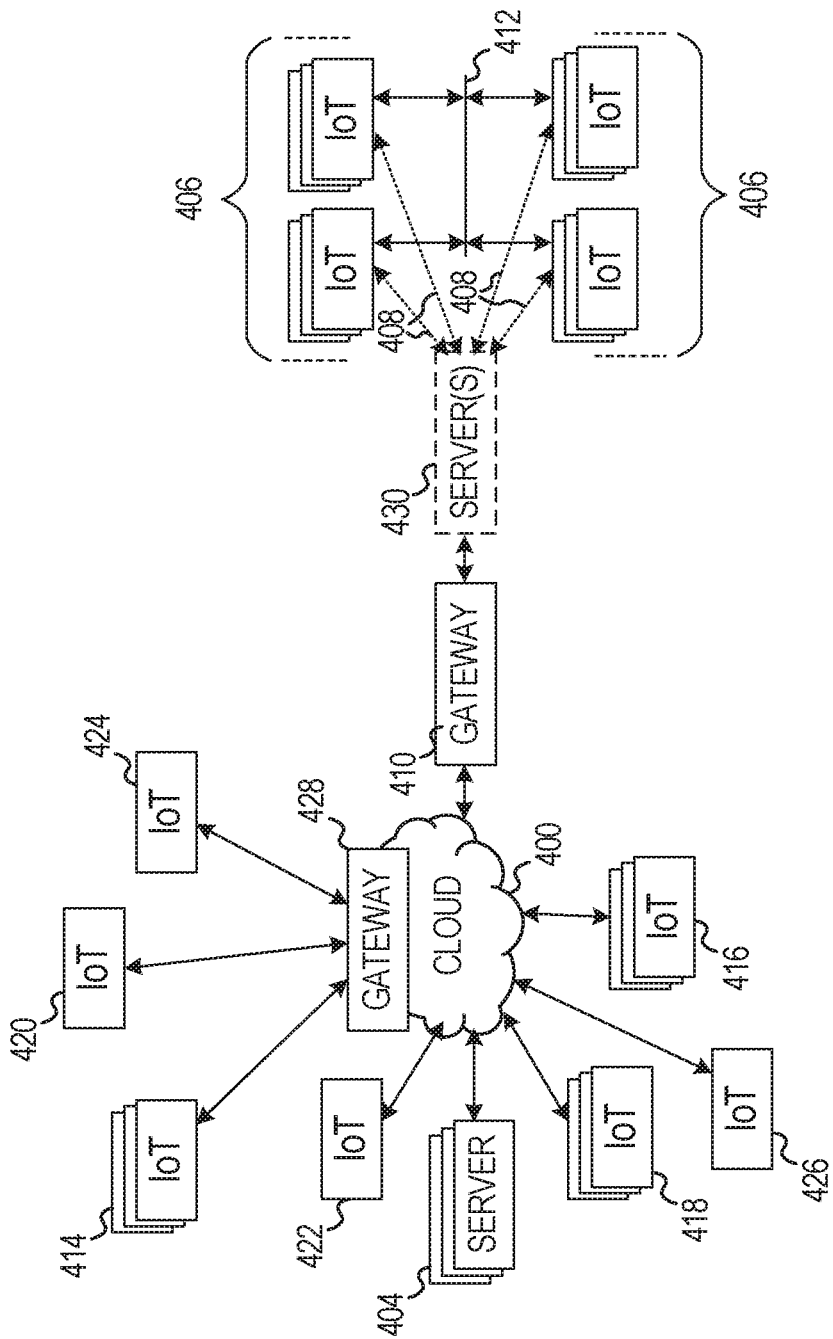
FIG. 6 illustrates a block diagram of a network illustrating communications among a number of IoT devices, according to an example.

FIG. 6 illustrates a drawing of a cloud computing network, or cloud 600, in communication with a number of Internet of Things (IoT) devices. The cloud 600 may represent the Internet, or may be a local area network (LAN), or a wide area network (WAN), such as a proprietary network for a company. The IoT devices may include any number of different types of devices, grouped in various combinations. For example, a traffic control group 606 may include IoT devices along streets in a city. These IoT devices may include stoplights, traffic flow monitors, cameras, weather sensors, and the like. The traffic control group 606, or other subgroups, may be in communication with the cloud 600 through wired or wireless links 608, such as LPWA links, optical links, and the like. Further, a wired or wireless sub-network 612 may allow the IoT devices to communicate with each other, such as through a local area network, a wireless local area network, and the like. The IoT devices may use another device, such as a gateway 610 or 628 to communicate with remote locations such as the cloud 600; the IoT devices may also use one or more servers 630 to facilitate communication with the cloud 600 or with the gateway 610. For example, the one or more servers 630 may operate as an intermediate network node to support a local edge cloud or fog implementation among a local area network. Further, the gateway 628 that is depicted may operate in a cloud-to-gateway-to-many edge devices configuration, such as with the various IoT devices 614, 620, 624 being constrained or dynamic to an assignment and use of resources in the cloud 600.

Other example groups of IoT devices may include remote weather stations 614, local information terminals 616, alarm systems 618, automated teller machines 620, alarm panels 622, or moving vehicles, such as emergency vehicles 624 or other vehicles 626, among many others. Each of these IoT devices may be in communication with other IoT devices, with servers 604, with another IoT fog device or system (not shown, but depicted in FIG. 2), or a combination therein. The groups of IoT devices may be deployed in various residential, commercial, and industrial settings (including in both private or public environments).

As may be seen from FIG. 6, a large number of IoT devices may be communicating through the cloud 600. This may allow different IoT devices to request or provide information to other devices autonomously. For example, group of IoT devices (e.g., the traffic control group 606) may request a current weather forecast from a group of remote weather stations 614, which may provide the forecast without human intervention. Further, an emergency vehicle 624 may be alerted by an automated teller machine 620 that a burglary is in progress. As the emergency vehicle 624 proceeds towards the automated teller machine 620, it may access the traffic control group 606 to request clearance to the location, for example, by lights turning red to block cross traffic at an intersection in sufficient time for the emergency vehicle 624 to have unimpeded access to the intersection.

Clusters of IoT devices, such as the remote weather stations 614 or the traffic control group 606, may be equipped to communicate with other IoT devices as well as with the cloud 600. This may allow the IoT devices to form an ad-hoc network between the devices, allowing them to function as a single device, which may be termed a fog device or system (e.g., as described above with reference to FIG. 2).

Figure 7:
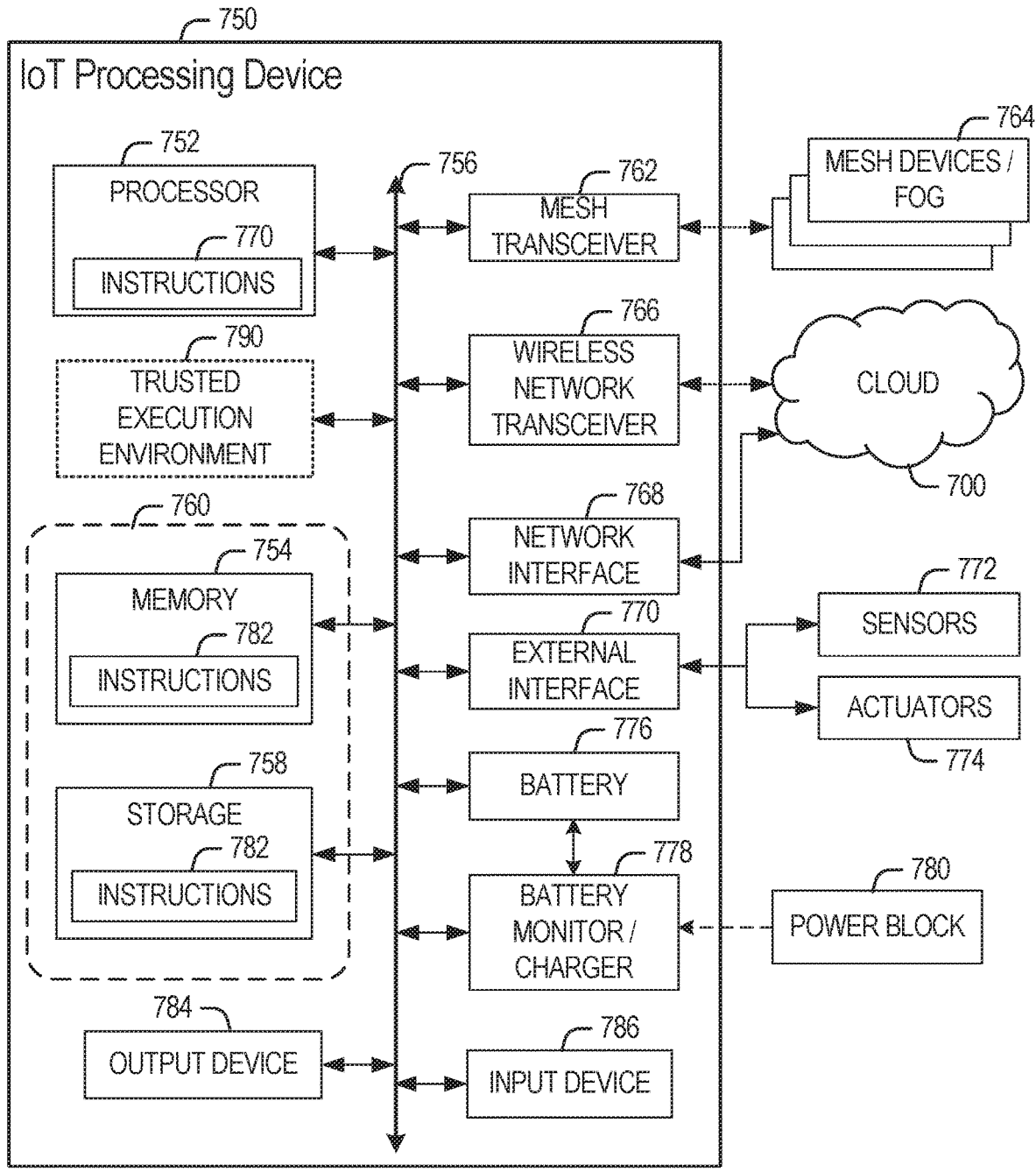
FIG. 7 illustrates a block diagram for an example IoT processing system architecture upon which any one or more of the techniques (e.g., operations, processes, methods, and methodologies) discussed herein may be performed, according to an example.

FIG. 7 is a block diagram of an example of components that may be present in an IoT device 750 for implementing the techniques described herein. The IoT device 750 may include any combinations of the components shown in the example or referenced in the disclosure above. The components may be implemented as ICs, portions thereof, discrete electronic devices, or other modules, logic, hardware, software, firmware, or a combination thereof adapted in the IoT device 750, or as components otherwise incorporated within a chassis of a larger system. Additionally, the block diagram of FIG. 7 is intended to depict a high-level view of components of the IoT device 750. However, some of the components shown may be omitted, additional components may be present, and different arrangement of the components shown may occur in other implementations.

The IoT device 750 may include a processor 752, which may be a microprocessor, a multi-core processor, a multi-threaded processor, an ultra-low voltage processor, an embedded processor, or other known processing element. The processor 752 may be a part of a system on a chip (SoC) in which the processor 752 and other components are formed into a single integrated circuit, or a single package, such as the Edison™ or Galileo™ SoC boards from Intel. As an example, the processor 752 may include an Intel® Architecture Core™ based processor, such as a Quark™, an Atom™, an i3, an i5, an i7, or an MCU-class processor, or another such processor available from Intel® Corporation, Santa Clara, Calif. However, any number other processors may be used, such as available from Advanced Micro Devices, Inc. (AMD) of Sunnyvale, Calif., a MIPS-based design from MIPS Technologies, Inc. of Sunnyvale, Calif., an ARM-based design licensed from ARM Holdings, Ltd. or customer thereof, or their licensees or adopters. The processors may include units such as an A5-A10 processor from Apple® Inc., a Snapdragon™ processor from Qualcomm® Technologies, Inc., or an OMAP™ processor from Texas Instruments, Inc.

The processor 752 may communicate with a system memory 754 over an interconnect 756 (e.g., a bus). Any number of memory devices may be used to provide for a given amount of system memory. As examples, the memory may be random access memory (RAM) in accordance with a Joint Electron Devices Engineering Council (JEDEC) design such as the DDR or mobile DDR standards (e.g., LPDDR, LPDDR2, LPDDR3, or LPDDR4). In various implementations the individual memory devices may be of any number of different package types such as single die package (SDP), dual die package (DDP) or quad die package (Q17P). These devices, in some examples, may be directly soldered onto a motherboard to provide a lower profile solution, while in other examples the devices are configured as one or more memory modules that in turn couple to the motherboard by a given connector. Any number of other memory implementations may be used, such as other types of memory modules, e.g., dual inline memory modules (DIMMs) of different varieties including but not limited to microDIMMs or MiniDIMMs.

To provide for persistent storage of information such as data, applications, operating systems and so forth, a storage 758 may also couple to the processor 752 via the interconnect 756. In an example the storage 758 may be implemented via a solid state disk drive (SSDD). Other devices that may be used for the storage 758 include flash memory cards, such as SD cards, microSD cards, xD picture cards, and the like, and USB flash drives. In low power implementations, the storage 758 may be on-die memory or registers associated with the processor 752. However, in some examples, the storage 758 may be implemented using a micro hard disk drive (HDD). Further, any number of new technologies may be used for the storage 758 in addition to, or instead of, the technologies described, such resistance change memories, phase change memories, holographic memories, or chemical memories, among others.

The components may communicate over the interconnect 756. The interconnect 756 may include any number of technologies, including industry standard architecture (ISA), extended ISA (EISA), peripheral component interconnect (PCI), peripheral component interconnect extended (PCIx), PCI express (PCIe), or any number of other technologies. The interconnect 756 may be a proprietary bus, for example, used in a SoC based system. Other bus systems may be included, such as an I2C interface, an SPI interface, point to point interfaces, and a power bus, among others.

The interconnect 756 may couple the processor 752 to a mesh transceiver 762, for communications with other mesh devices 764. The mesh transceiver 762 may use any number of frequencies and protocols, such as 2.4 Gigahertz (GHz) transmissions under the IEEE 802.15.4 standard, using the Bluetooth® low energy (BLE) standard, as defined by the Bluetooth® Special Interest Group, or the ZigBee® standard, among others. Any number of radios, configured for a particular wireless communication protocol, may be used for the connections to the mesh devices 764. For example, a WLAN unit may be used to implement Wi-Fi™ communications in accordance with the Institute of Electrical and Electronics Engineers (IEEE) 802.11 standard. In addition, wireless wide area communications, e.g., according to a cellular or other wireless wide area protocol, may occur via a WWAN unit.

The mesh transceiver 762 may communicate using multiple standards or radios for communications at different range. For example, the IoT device 750 may communicate with close devices, e.g., within about 10 meters, using a local transceiver based on BLE, or another low power radio, to save power. More distant mesh devices 764, e.g., within about 50 meters, may be reached over ZigBee or other intermediate power radios. Both communications techniques may take place over a single radio at different power levels, or may take place over separate transceivers, for example, a local transceiver using BLE and a separate mesh transceiver using ZigBee.

A wireless network transceiver 766 may be included to communicate with devices or services in the cloud 700 via local or wide area network protocols. The wireless network transceiver 766 may be a LPWA transceiver that follows the IEEE 802.15.4, or IEEE 802.15.4g standards, among others. The IoT device 750 may communicate over a wide area using LoRaWAN™ (Long Range Wide Area Network) developed by Semtech and the LoRa Alliance. The techniques described herein are not limited to these technologies, but may be used with any number of other cloud transceivers that implement long range, low bandwidth communications, such as Sigfox, and other technologies. Further, other communications techniques, such as time-slotted channel hopping, described in the IEEE 802.15.4e specification may be used.

Any number of other radio communications and protocols may be used in addition to the systems mentioned for the mesh transceiver 762 and wireless network transceiver 766, as described herein. For example, the radio transceivers 762 and 766 may include an LTE or other cellular transceiver that uses spread spectrum (SPA/SAS) communications for implementing high speed communications. Further, any number of other protocols may be used, such as Wi-Fi® networks for medium speed communications and provision of network communications.

The radio transceivers 762 and 766 may include radios that are compatible with any number of 3GPP (Third Generation Partnership Project) specifications, notably Long Term Evolution (LTE), Long Term Evolution-Advanced (LTE-A), and Long Term Evolution-Advanced Pro (LTE-A Pro). It may be noted that radios compatible with any number of other fixed, mobile, or satellite communication technologies and standards may be selected. These may include, for example, any Cellular Wide Area radio communication technology, which may include e.g. a 5th Generation (5G) communication systems, a Global System for Mobile Communications (GSM) radio communication technology, a General Packet Radio Service (GPRS) radio communication technology, or an Enhanced Data Rates for GSM Evolution (EDGE) radio communication technology, a UMTS (Universal Mobile Telecommunications System) communication technology, In addition to the standards listed above, any number of satellite uplink technologies may be used for the wireless network transceiver 766, including, for example, radios compliant with standards issued by the ITU (International Telecommunication Union), or the ETSI (European Telecommunications Standards Institute), among others. The examples provided herein are thus understood as being applicable to various other communication technologies, both existing and not yet formulated.

A network interface controller (NIC) 768 may be included to provide a wired communication to the cloud 700 or to other devices, such as the mesh devices 764. The wired communication may provide an Ethernet connection, or may be based on other types of networks, such as Controller Area Network (CAN), Local Interconnect Network (LIN), DeviceNet, ControlNet, Data Highway+, PROFIBUS, or PROFINET, among many others. An additional NIC 768 may be included to allow connect to a second network, for example, a NIC 768 providing communications to the cloud over Ethernet, and a second NIC 768 providing communications to other devices over another type of network.

The interconnect 756 may couple the processor 752 to an external interface 770 that is used to connect external devices or subsystems. The external devices may include sensors 772, such as accelerometers, level sensors, flow sensors, optical light sensors, camera sensors, temperature sensors, a global positioning system (GPS) sensors, pressure sensors, barometric pressure sensors, and the like. The external interface 770 further may be used to connect the IoT device 750 to actuators 774, such as power switches, valve actuators, an audible sound generator, a visual warning device, and the like.

In some optional examples, various input/output (I/O) devices may be present within, or connected to, the IoT device 750. For example, a display or other output device 784 may be included to show information, such as sensor readings or actuator position. An input device 786, such as a touch screen or keypad may be included to accept input. An output device 784 may include any number of forms of audio or visual display, including simple visual outputs such as binary status indicators (e.g., LEDs) and multi-character visual outputs, or more complex outputs such as display screens (e.g., LCD screens), with the output of characters, graphics, multimedia objects, and the like being generated or produced from the operation of the IoT device 750.

A battery 776 may power the IoT device 750, although in examples in which the IoT device 750 is mounted in a fixed location, it may have a power supply coupled to an electrical grid. The battery 776 may be a lithium ion battery, or a metal-air battery, such as a zinc-air battery, an aluminum-air battery, a lithium-air battery, and the like.

A battery monitor/charger 778 may be included in the IoT device 750 to track the state of charge (SoCh) of the battery 776. The battery monitor/charger 778 may be used to monitor other parameters of the battery 776 to provide failure predictions, such as the state of health (SoH) and the state of function (SoF) of the battery 776. The battery monitor/charger 778 may include a battery monitoring integrated circuit, such as an LTC4020 or an LTC2990 from Linear Technologies, an ADT7488A from ON Semiconductor of Phoenix Ariz., or an IC from the UCD90xxx family from Texas Instruments of Dallas, Tex. The battery monitor/charger 778 may communicate the information on the battery 776 to the processor 752 over the interconnect 756. The battery monitor/charger 778 may also include an analog-to-digital (ADC) convertor that allows the processor 752 to directly monitor the voltage of the battery 776 or the current flow from the battery 776. The battery parameters may be used to determine actions that the IoT device 750 may perform, such as transmission frequency, mesh network operation, sensing frequency, and the like.

A power block 780, or other power supply coupled to a grid, may be coupled with the battery monitor/charger 778 to charge the battery 776. In some examples, the power block 780 may be replaced with a wireless power receiver to obtain the power wirelessly, for example, through a loop antenna in the IoT device 750. A wireless battery charging circuit, such as an LTC4020 chip from Linear Technologies of Milpitas, Calif., among others, may be included in the battery monitor/charger 778. The specific charging circuits chosen depend on the size of the battery 776, and thus, the current required. The charging may be performed using the Airfuel standard promulgated by the Airfuel Alliance, the Qi wireless charging standard promulgated by the Wireless Power Consortium, or the Rezence charging standard, promulgated by the Alliance for Wireless Power, among others.

The storage 758 may include instructions 782 in the form of software, firmware, or hardware commands to implement the techniques described herein. Although such instructions 782 are shown as code blocks included in the memory 754 and the storage 758, it may be understood that any of the code blocks may be replaced with hardwired circuits, for example, built into an application specific integrated circuit (ASIC).

In an example, the instructions 782 provided via the memory 754, the storage 758, or the processor 752 may be embodied as a non-transitory, machine readable medium 760 including code to direct the processor 752 to perform electronic operations in the IoT device 750. The processor 752 may access the non-transitory, machine readable medium 760 over the interconnect 756. For instance, the non-transitory, machine readable medium 760 may be embodied by devices described for the storage 758 of FIG. 7 or may include specific storage units such as optical disks, flash drives, or any number of other hardware devices. The non-transitory, machine readable medium 760 may include, such as by providing or invoking instructions to direct the processor 752 to perform a specific sequence or flow of actions, for example, as described with respect to the flowchart(s) and block diagram(s) of operations and functionality depicted above.

In still a specific example, the instructions 788 on the processor 752 (separately, or in combination with the instructions 788 of the machine readable medium 760) may configure execution or operation of a trusted execution environment (TEE) 790. In an example, the TEE 790 operates as a protected area accessible to the processor 752 for secure execution of instructions and secure access to data. Various implementations of the TEE 790, and an accompanying secure area in the processor 752 or the memory 754 may be provided, for instance, through use of Intel® Software Guard Extensions (SGX) or ARM® TrustZone® hardware security extensions, Intel® Management Engine (ME), or Intel® Converged Security Manageability Engine (CSME). Other aspects of security hardening, hardware roots-of-trust, and trusted or protected operations may be implemented in the device 750 through the TEE 790 and the processor 752.

In further examples, a machine-readable medium also includes any tangible medium that is capable of storing, encoding or carrying instructions for execution by a machine and that cause the machine to perform any one or more of the methodologies of the present disclosure or that is capable of storing, encoding or carrying data structures utilized by or associated with such instructions. A "machine-readable medium" thus may include, but is not limited to, solid-state memories, and optical and magnetic media. Specific examples of machine-readable media include non-volatile memory, including but not limited to, by way of example, semiconductor memory devices (e.g., electrically programmable read-only memory (EPROM), electrically erasable programmable read-only memory (EEPROM)) and flash memory devices; magnetic disks such as internal hard disks and removable disks; magneto-optical disks; and CD-ROM and DVD-ROM disks. The instructions embodied by a machine-readable medium may further be transmitted or received over a communications network using a transmission medium via a network interface device utilizing any one of a number of transfer protocols (e.g., HTTP).

It should be understood that the functional units or capabilities described in this specification may have been referred to or labeled as components or modules, in order to more particularly emphasize their implementation independence. Such components may be embodied by any number of software or hardware forms. For example, a component or module may be implemented as a hardware circuit comprising custom very-large-scale integration (VLSI) circuits or gate arrays, off-the-shelf semiconductors such as logic chips, transistors, or other discrete components. A component or module may also be implemented in programmable hardware devices such as field programmable gate arrays, programmable array logic, programmable logic devices, or the like. Components or modules may also be implemented in software for execution by various types of processors. An identified component or module of executable code may, for instance, comprise one or more physical or logical blocks of computer instructions, which may, for instance, be organized as an object, procedure, or function. Nevertheless, the executables of an identified component or module need not be physically located together, but may comprise disparate instructions stored in different locations which, when joined logically together, comprise the component or module and achieve the stated purpose for the component or module.

Indeed, a component or module of executable code may be a single instruction, or many instructions, and may even be distributed over several different code segments, among different programs, and across several memory devices or processing systems. In particular, some aspects of the described process (such as code rewriting and code analysis) may take place on a different processing system (e.g., in a computer in a data center), than that in which the code is deployed (e.g., in a computer embedded in a sensor or robot). Similarly, operational data may be identified and illustrated herein within components or modules, and may be embodied in any suitable form and organized within any suitable type of data structure. The operational data may be collected as a single data set, or may be distributed over different locations including over different storage devices, and may exist, at least partially, merely as electronic signals on a system or network. The components or modules may be passive or active, including agents operable to perform desired functions.

Figure 8:
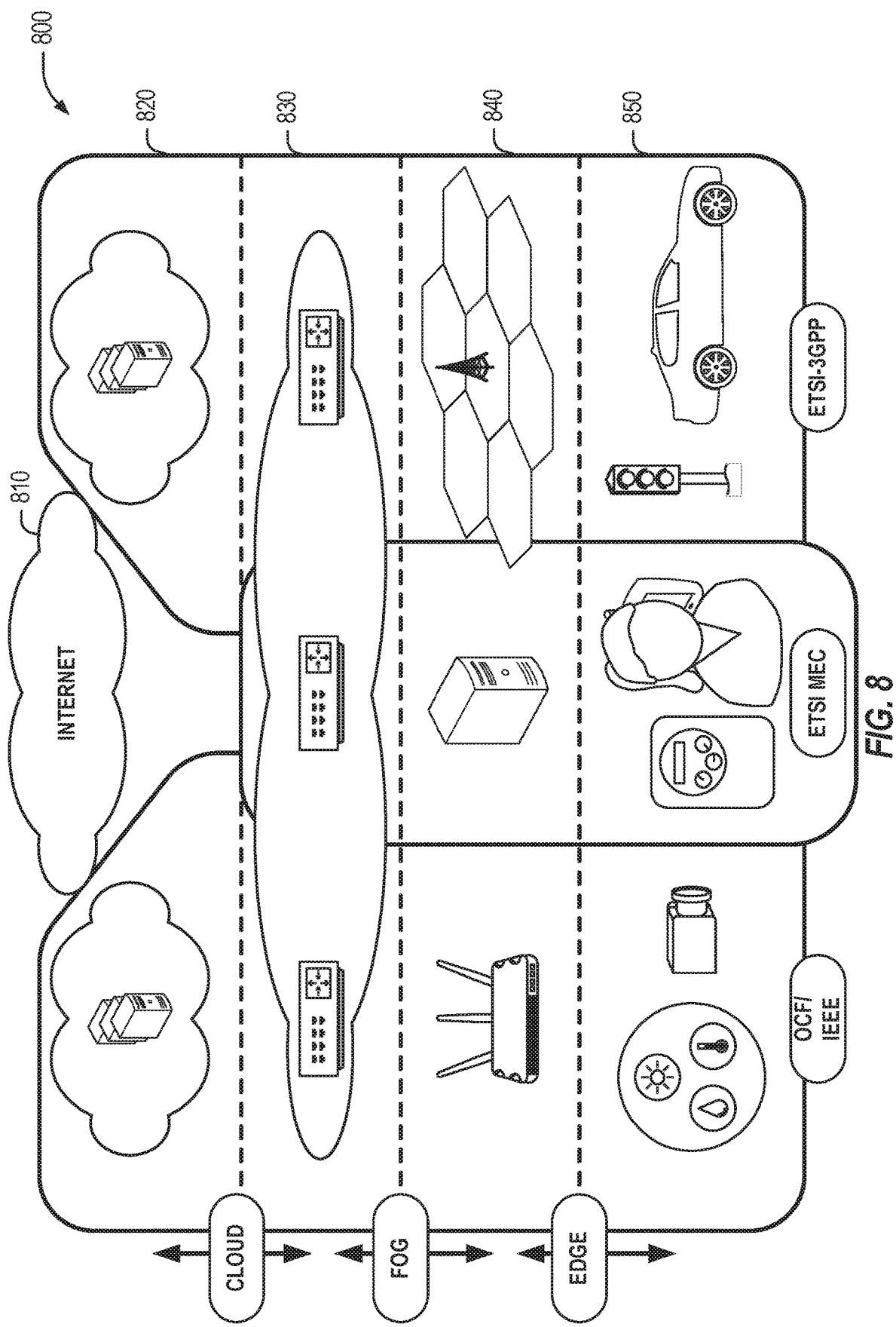
FIG. 8 illustrates a system of networked components, according to an example.

FIG. 8 illustrates a system 800 of networked components, according to an example. The system 800 may include devices, services, or networks configured to communicate using OCF/IEEE communications standards (e.g., as defined above). ETSI Mobile Edge Computing or Multi-access Edge Computing (MEC) standards, or ETSI-3GPP standards. The networked components of system 800 communicate across different levels of network, such as the internet 810, cloud devices 820, routing devices 830, station/access point/server connection devices 840, and end devices 850.

The various layers and networked components may be generally categorized as cloud (internet 810, cloud devices 820), fog (routing devices 830, station/access point/server connection devices 840), and edge devices (station/access point/server connection devices 840, end devices 850), although any of the networked components may be set up to be in any of the layers. A fog network may represent a dense geographical distribution of near-user edge devices (e.g., fog nodes), equipped with storage capabilities (e.g., to avoid the need to store data in cloud data centers), communication capabilities (e.g., rather than routed over the internet backbone), control capabilities, configuration capabilities, measurement and management capabilities (rather than controlled primarily by network gateways such as those in the LTE core network), among others.

The end devices 850 may include IoT devices, vehicles, mobile devices, sensors, or the like. The station/access point/server connection devices 840 may include a wireless access point (e.g., for WiFi), a server or other connection device (which may include a mobile device, such as a phone or a tablet), or a station (e.g., a base station or Node B, such as an enhanced Node B (eNB), according to 3GPP specifications). The routing devices 830 may include a switch, a server, a router, or the like, which may be physical or virtual. The cloud devices 820 may be servers or other devices. The internet 810 may represent any devices not within the system 800.

MEC may encompass an architecture that enable cloud computing functionality or information technology (IT) services at network (e.g., cellular network) edges. MEC may reduce network congestion by moving applications, data, discovery, etc. closer to the user (e.g., mobile device, user equipment (UE), station (STA), etc.). Some MEC details dealing with security (e.g., both user security as well as application integrity), radio use, etc., have been promulgated by ETSI, such as in the "Mobile Edge Computing Introductory Technical White Paper," published Sep. 1, 2014.

In MEC implementations of the system 800, a device (e.g., a server) may be used as a mobile edge host, such as a localized server (e.g., a street server, embedded in a traffic signal device or system, etc.). Another device in the system 800 may be used as an end device (e.g., a mobile device such as a phone, a laptop, a tablet, an IoT device, a vehicle, etc.). The end device may communicate with the localized server to offload computationally intensive applications or actions such as graphical rendering (e.g., high-speed browsing artificial reality or virtual reality, 3D gaming applications, video processing etc.), intermediate data-processing (e.g., sensor data cleansing, video analysis, etc.), or value-added services (e.g., translation, log analytics, etc.).

An end device may initiate a MEC service for a specific application or action, which may be started on an appropriate MEC host (e.g., the localized server). The application may have a set of requirements (e.g. latency, compute resources, storage resources, location, network capability, security condition etc.) that are fulfilled by the MEC host (e.g., server). The system 800 may select a host fulfilling the requirements (e.g., by using the station/access point/server connection devices 840).

The MEC implementation of system 800 may be used to improve application and service mobility and service continuation among multiple edge computing hosts and groups (such as for automobiles, or user movement within and in/outside of service areas). Application and service customization at the MEC host for network operator-trusted mobile edge applications (e.g., for targeted advertising, enterprise services, group-based content, subscriber content) may be implemented using the system 800).

An example technique using the MEC implementation of system 800 is described below. A client device (e.g., an application running on a client device) provides an initial trigger that requests a service (e.g. an edge V2X application that consumes data from sensors or other terminals). A discovery and measurement phase is performed (e.g., by a MEC orchestrator, such as an onboarding tool or notifier device acting as a server) that may be indirectly triggered by the client device or done periodically or upon another trigger (e.g., a network request or a resource update) establish the network topology. After entities are discovered (e.g., potential application participants), security for notifying or observing may be performed. When a resource update is made available to the notifier device, the notifier device may notify the client device of the update. Accordingly, any of the techniques described above (e.g., techniques 500 or 600 above) may be implemented using the MEC infrastructure of system 800.

MEC offers application developers and content providers cloud-computing capabilities and an IT service environment at the edge of the network. This environment offers ultra-low latency and high bandwidth throughput as well as real-time access to radio network information that may be leveraged by applications. MEC technology permits flexible and rapid deployments of innovative applications and services towards mobile subscribers, enterprises, or vertical segments.

Example 1 is a device for notifying a client device of an update to a resource comprising: processing circuitry, and a memory device including instructions embodied thereon, wherein the instructions, which when executed by the processing circuitry, configure the processing circuitry to perform operations to: receive an observe request from the client device for the resource; verify that the client device is permitted to observe the resource; in response to successful verification of the client device, add the client device as an observer for the resource; determine the update to the resource has occurred; and notify the client device of the update to the resource.

In Example 2, the subject matter of Example 1 includes, wherein the observe request includes a OBSERVE command implemented as part of a set of RESTful commands.

In Example 3, the subject matter of Examples 1-2 includes, wherein operations to verify that the client device is permitted to observe the resource includes use of a secure resource manager to evaluate an access control list (ACL) policy.

In Example 4, the subject matter of Examples 1-3 includes, wherein operations to verify that the client device is permitted to observe the resource include operations to request access information from an Access Management Service (AMS).

In Example 5, the subject matter of Example 4 includes, wherein the device is an Open Connectivity Foundation (OCF) device acting as a server to the client device and wherein the AMS operates within an OCF onboarding tool or within an OCF generalized client.

In Example 6, the subject matter of Examples 1-5 includes, wherein operations to notify the client device include operations to notify the client device over a secure session established between the device and the client device.

In Example 7, the subject matter of Examples 1-6 includes, wherein operations to notify include operations to send a RESTful UPDATE command or a RESTful NOTIFY command.

In Example 8, the subject matter of Examples 1-7 includes, operations to, before notifying the client device, re-verify that the client device is permitted to observe the resource.

In Example 9, the subject matter of Examples 1-8 includes, operations to: receive a response from the client device indicating that the device is not in a list of notifiers at the client device in response to the notification of the update; and remove the client device from a list of observers of the resource.

In Example 10, the subject matter of Examples 1-9 includes, wherein the resource represents a sensor or an actuator.

Example 11 is a method for notifying a client device of an update to a resource, comprising a plurality of operations executed with a processor and memory of a device, the plurality of operations comprising: receiving an observe request from the client device for the resource; verifying that the client device is permitted to observe the resource; in response to successful verification of the client device, adding the client device as an observer for the resource; receiving access to a callback resource maintained by the client device, the callback resource corresponding to the resource; determining the update to the resource has occurred; and notifying the client device of the update to the resource.

In Example 12, the subject matter of Example 11 includes, wherein the observe request includes an OBSERVE command implemented as part of a set of RESTful commands.

In Example 13, the subject matter of Examples 11-12 includes, wherein verifying that the client device is permitted to observe the resource includes using a secure resource manager to evaluate an access control list (ACL) policy.

In Example 14, the subject matter of Examples 11-13 includes, wherein verifying that the client device is permitted to observe the resource includes requesting access information from an Access Management Service (AMS).

In Example 15, the subject matter of Example 14 includes, wherein the device is an Open Connectivity Foundation (OCF) device acting as a server to the client device and wherein the AMS operates within an OCF onboarding tool or within an OCF generalized client.

In Example 16, the subject matter of Examples 11-15 includes, wherein notifying the client device includes notifying the client device over a secure session established between the device and the client device.

In Example 17, the subject matter of Examples 11-16 includes, wherein notifying includes sending a RESTful UPDATE command or a RESTful NOTIFY command.

In Example 18, the subject matter of Examples 11-17 includes, before notifying the client device, re-verifying that the client device is permitted to observe the resource.

In Example 19, the subject matter of Examples 11-18 includes, receiving a response from the client device indicating that the device is not in a list of notifiers at the client device in response to the notification of the update; and removing the client device from a list of observers of the resource.

In Example 20, the subject matter of Examples 11-19 includes, wherein the resource represents a sensor or an actuator.

Example 21 is at least one machine-readable medium including instructions for operation of a computing system, which when executed by a machine, cause the machine to perform operations of any of the methods of Examples 11-20.

Example 22 is an apparatus comprising means for performing any of the methods of Examples 11-20.

Example 23 is a machine-readable storage medium including instructions for notifying a client device of an update to a resource, wherein the instructions, when executed by a processing circuitry of a device, cause the processing circuitry to: receive an observe request from the client device for the resource; verify that the client device is permitted to observe the resource; in response to successful verification of the client device, add the client device as an observer for the resource; receive access to a callback resource maintained by the client device, the callback resource corresponding to the resource; determine the update to the resource has occurred; and notify the client device of the update to the resource.

In Example 24, the subject matter of Example 23 includes, wherein the observe request includes an OBSERVE command implemented as part of a set of RESTful commands.

In Example 25, the subject matter of Examples 23-24 includes, wherein to verify that the client device is permitted to observe the resource includes using a secure resource manager to evaluate an access control list policy (ACL).

In Example 26, the subject matter of Examples 23-25 includes, wherein to verify that the client device is permitted to observe the resource includes requesting access information from an Access Management Service (AMS).

In Example 27, the subject matter of Example 26 includes, wherein the device is an Open Connectivity Foundation (OCF) device acting as a server to the client device and wherein the AMS operates within an OCF onboarding tool or within an OCF generalized client.

In Example 28, the subject matter of Examples 23-27 includes, wherein to notify the client device includes notifying the client device over a secure session established between the device and the client device.

In Example 29, the subject matter of Examples 23-28 includes, wherein to notify includes sending a RESTful UPDATE command or a RESTful NOTIFY command.

In Example 30, the subject matter of Examples 23-29 includes, operations to, before notifying the client device, re-verify that the client device is permitted to observe the resource.

In Example 31, the subject matter of Examples 23-30 includes, operations to: receive a response from the client device indicating that the device is not in a list of notifiers at the client device in response to the notification of the update; and remove the client device from a list of observers of the resource.

In Example 32, the subject matter of Examples 23-31 includes, wherein the resource represents a sensor or an actuator.

Example 33 is an apparatus for notifying a client device of an update to a resource, comprising: means for receiving an observe request from the client device for the resource; means for verifying that the client device is permitted to observe the resource; in response to successful verification of the client device, means for adding the client device as an observer for the resource; means for receiving access to a callback resource maintained by the client device, the callback resource corresponding to the resource; means for determining the update to the resource has occurred; and means for notifying the client device of the update to the resource.

In Example 34, the subject matter of Example 33 includes, wherein the observe request includes an OBSERVE command implemented as part of a set of RESTful commands.

In Example 35, the subject matter of Examples 33-34 includes, wherein the means for verifying that the client device is permitted to observe the resource include means for using a secure resource manager to evaluate an access control list policy (ACL).

In Example 36, the subject matter of Examples 33-35 includes, wherein the means for verifying that the client device is permitted to observe the resource include means for requesting access information from an Access Management Service (AMS).

In Example 37, the subject matter of Example 36 includes, wherein the apparatus is an Open Connectivity Foundation (OCF) device acting as a server to the client device and wherein the AMS operates within an OCF onboarding tool or within an OCF generalized client.

In Example 38, the subject matter of Examples 33-37 includes, wherein the means for notifying the client device include means for notifying the client device over a secure session established between the apparatus and the client device.

In Example 39, the subject matter of Examples 33-38 includes, wherein the means for notifying include means for sending a RESTful UPDATE command or a RESTful NOTIFY command.

In Example 40, the subject matter of Examples 33-39 includes, before notifying the client device, means for re-verifying that the client device is permitted to observe the resource.

In Example 41, the subject matter of Examples 33-40 includes, means for receiving a response from the client device indicating that the device is not in a list of notifiers at the client device in response to the notification of the update; and means for removing the client device from a list of observers of the resource.

In Example 42, the subject matter of Examples 33-41 includes, wherein the resource represents a sensor or an actuator.

Example 43 is a client device, comprising: processing circuitry; and a memory device including instructions embodied thereon, wherein the instructions, which when executed by the processing circuitry, configure the processing circuitry to perform operations to: receive notification of observe permission for a resource; instantiate a callback resource maintained at the client device corresponding to the resource; send an observe request to a second device for the resource; add the second device to a list of notification servers maintained at the client device; receive a notification from the second device including an update to the resource; and update the callback resource based on the notification.

In Example 44, the subject matter of Example 43 includes, wherein the observe request includes an OBSERVE command implemented as part of a set of RESTful commands.

In Example 45, the subject matter of Examples 43-44 includes, operations to verify that the second device is authorized to notify the client device of the update to the resource before updating the callback resource.

In Example 46, the subject matter of Example 45 includes, wherein operations to verify that the second device is authorized to notify the client device of the update to the resource includes use of a secure resource manager to evaluate an access control list (ACL) policy.

In Example 47, the subject matter of Examples 43-46 includes, wherein operations to verify that the second device is authorized to notify the client device of the update to the resource include operations to request access information from an Access Management Service (AMS).

In Example 48, the subject matter of Example 47 includes, wherein the second device is an Open Connectivity Foundation (OCF) device acting as a server to the client device and wherein the AMS operates within an OCF onboarding tool or within an OCF generalized client.

In Example 49, the subject matter of Examples 43-48 includes, wherein operations to receive the notification include operations to receive the notification over a secure session established between the second device and the client device.

In Example 50, the subject matter of Examples 43-49 includes, wherein the notification includes a RESTful UPDATE command or a RESTful NOTIFY command.

In Example 51, the subject matter of Examples 43-50 includes, operations to: release the callback resource; remove the second device from the list of notification servers; receive a second notification from the second device including a second update to the resource; and send a response to the second device indicating that the second device is not in a list of notifiers at the client device in response to the second notification.

In Example 52, the subject matter of Examples 43-51 includes, wherein the resource represents a sensor or an actuator.

Example 53 is a method, comprising a plurality of operations executed with a processor and memory of a device, the plurality of operations comprising: receiving notification of observe permission for a resource; instantiating a callback resource maintained at the client device corresponding to the resource; sending an observe request to a second device for the resource; adding the second device to a list of notification servers maintained at the client device; receiving a notification from the second device including an update to the resource; and updating the callback resource based on the notification.

In Example 54, the subject matter of Example 53 includes, wherein the observe request includes an OBSERVE command implemented as part of a set of RESTful commands.

In Example 55, the subject matter of Examples 53-54 includes, verifying that the second device is authorized to notify the client device of the update to the resource before updating the callback resource.

In Example 56, the subject matter of Example 55 includes, wherein verifying that the second device is authorized to notify the client device of the update to the resource includes using a secure resource manager to evaluate an access control list (ACL) policy.

In Example 57, the subject matter of Examples 53-56 includes, wherein verifying that the second device is authorized to notify the client device of the update to the resource includes requesting access information from an Access Management Service (AMS).

In Example 58, the subject matter of Example 57 includes, wherein the second device is an Open Connectivity Foundation (OCF) device acting as a server to the client device and wherein the AMS operates within an OCF onboarding tool or within an OCF generalized client.

In Example 59, the subject matter of Examples 53-58 includes, wherein receiving the notification includes receiving the notification over a secure session established between the second device and the client device.

In Example 60, the subject matter of Examples 53-59 includes, wherein the notification includes a RESTful UPDATE command or a RESTful NOTIFY command.

In Example 61, the subject matter of Examples 53-60 includes, releasing the callback resource; removing the second device from the list of notification servers; receiving a second notification from the second device including a second update to the resource; and sending a response to the second device indicating that the second device is not in a list of notifiers at the client device in response to the second notification.

In Example 62, the subject matter of Examples 53-61 includes, wherein the resource represents a sensor or an actuator.

Example 63 is at least one machine-readable medium including instructions for operation of a computing system, which when executed by a machine, cause the machine to perform operations of any of the methods of Examples 53-62.

Example 64 is an apparatus comprising means for performing any of the methods of Examples 53-62.

Example 65 is a machine-readable storage medium including instructions for notifying a client device of an update to a resource, wherein the instructions, when executed by a processing circuitry of a device, cause the processing circuitry to: receive notification of observe permission for a resource; instantiate a callback resource maintained at the client device corresponding to the resource; send an observe request to a second device for the resource; add the second device to a list of notification servers maintained at the client device; receive a notification from the second device including an update to the resource; and update the callback resource based on the notification.

In Example 66, the subject matter of Example 65 includes, wherein the observe request includes an OBSERVE command implemented as part of a set of RESTful commands.

In Example 67, the subject matter of Examples 65-66 includes, operations to verify that the second device is authorized to notify the client device of the update to the resource before updating the callback resource.

In Example 68, the subject matter of Example 67 includes, wherein to verify that the second device is authorized to notify the client device of the update to the resource includes using a secure resource manager to evaluate an access control list (ACL) policy.

In Example 69, the subject matter of Examples 65-68 includes, wherein to verify that the second device is authorized to notify the client device of the update to the resource includes requesting access information from an Access Management Service (AMS).

In Example 70, the subject matter of Example 69 includes, wherein the second device is an Open Connectivity Foundation (OCF) device acting as a server to the client device and the AMS operates within an OCF onboarding tool or within an OCF generalized client.

In Example 71, the subject matter of Examples 65-70 includes, wherein to receive the notification includes receiving the notification over a secure session established between the second device and the client device.

In Example 72, the subject matter of Examples 65-71 includes, wherein the notification includes a RESTful UPDATE command or a RESTful NOTIFY command.

In Example 73, the subject matter of Examples 65-72 includes, operations to: release the callback resource; remove the second device from the list of notification servers; receive a second notification from the second device including a second update to the resource; and send a response to the second device indicating that the second device is not in a list of notifiers at the client device in response to the second notification.

In Example 74, the subject matter of Examples 65-73 includes, wherein the resource represents a sensor or an actuator.

Example 75 is an apparatus comprising: means for receiving notification of observe permission for a resource; means for instantiating a callback resource maintained at the client device corresponding to the resource; means for sending an observe request to a second device for the resource; means for adding the second device to a list of notification servers maintained at the client device; means for receiving a notification from the second device including an update to the resource; and means for updating the callback resource based on the notification.

In Example 76, the subject matter of Example 75 includes, wherein the observe request includes an OBSERVE command implemented as part of a set of RESTful commands.

In Example 77, the subject matter of Examples 75-76 includes, means for verifying that the second device is authorized to notify the client device of the update to the resource before updating the callback resource.

In Example 78, the subject matter of Example 77 includes, wherein the means for verifying that the second device is authorized to notify the client device of the update to the resource include means for using a secure resource manager to evaluate an access control list (ACL) policy.

In Example 79, the subject matter of Examples 75-78 includes, wherein the means for verifying that the second device is authorized to notify the client device of the update to the resource include means for requesting access information from an Access Management Service (AMS).

In Example 80, the subject matter of Example 79 includes, wherein the second device is an Open Connectivity Foundation (OCF) device acting as a server to the client device and wherein the AMS operates within an OCF onboarding tool or within an OCF generalized client.

In Example 81, the subject matter of Examples 75-80 includes, wherein the means for receiving the notification include means for receiving the notification over a secure session established between the second device and the client device.

In Example 82, the subject matter of Examples 75-81 includes, wherein the notification includes a RESTful UPDATE command or a RESTful NOTIFY command.

In Example 83, the subject matter of Examples 75-82 includes, means for releasing the callback resource; means for removing the second device from the list of notification servers; means for receiving a second notification from the second device including a second update to the resource; and means for sending a response to the second device indicating that the second device is not in a list of notifiers at the client device in response to the second notification.

In Example 84, the subject matter of Examples 75-83 includes, wherein the resource represents a sensor or an actuator.

Example 85 is a system comprising: a first device comprising a processor to: receive an observe request from a second device for a resource; verify that the second device is permitted to observe the resource; in response to successful verification of the second device, add the second device as an observer for the resource; determine the update to the resource has occurred; and send a notification to the second device of the update to the resource; and the second device comprising a processor to: instantiate a callback resource maintained at the second device corresponding to the resource; add the first device to a list of notification servers maintained at the second device; and in response to receiving the notification, update the callback resource based on the notification.

In Example 86, the subject matter of Example 85 includes, the system further comprising an Access Management Service (AMS) to maintain an access control list, the access control list including credentials and asymmetric permissions for at least one of the first device or the second device.

In Example 87, the subject matter of Example 86 includes, wherein the AMS operates on an Open Connectivity Foundation (OCF) device and wherein to verify that the second device is permitted to observe the resource, the AMS is to respond to the first device indicating whether the second device is permitted to observe the resource.

In Example 88, the subject matter of Examples 85-87 includes, wherein the second device is further to verify that the first device is authorized to notify the second device of the update to the resource before updating the callback resource.

In Example 89, the subject matter of Examples 85-88 includes, wherein the second device is further to: release the callback resource; remove the first device from the list of notification servers stored on the second device; receive a second notification from the first device including a second update to the resource; and send a response to the first device indicating that the first device is not in a list of notifiers at the second device in response to the second notification; and wherein the first device is further to, in response to receiving the response, remove the second device from a list of observers.

In Example 90, the subject matter of Examples 85-89 includes, wherein the first device is an Open Connectivity Foundation (OCF) device acting as a server and wherein the second device is an OCF device acting as a client device.

In Example 91, the subject matter of Examples 85-90 includes, wherein the resource represents a sensor or an actuator.

Example 92 is at least one machine-readable medium including instructions that, when executed by processing circuitry, cause the processing circuitry to perform operations to implement of any of Examples 1-91.

Example 93 is an apparatus comprising means to implement of any of Examples 1-91.

Example 94 is a system to implement of any of Examples 1-91.

Example 95 is a method to implement of any of Examples 1-91.

In the above Detailed Description, various features may be grouped together to streamline the disclosure. However, the claims may not set forth every feature disclosed herein as embodiments may feature a subset of said features. Further, embodiments may include fewer features than those disclosed in a particular example. Thus, the following claims are hereby incorporated into the Detailed Description, with a claim standing on its own as a separate embodiment.

What is claimed is:

1. A client device, comprising:
processing circuitry; and
a memory device including instructions embodied thereon, wherein the instructions, which when executed by the processing circuitry, configure the processing circuitry to perform operations to:
receive notification of observe permission for a resource;
instantiate a callback resource maintained and stored at the client device, the callback resource corresponding to the resource, wherein the callback resource includes control policies corresponding to the resource;
send an observe request to a second device for the resource;
add the second device to a list of notification servers maintained at the client device;
receive a notification from the second device, the notification including an update to the resource; and
update the callback resource, stored at the client device, to mirror the resource based on the notification.

2. The client device of claim 1, wherein the observe request includes an OBSERVE command implemented as part of a set of RESTful commands.

3. The client device of claim 1, further comprising operations to verify that the second device is authorized to notify the client device of the update to the resource before updating the callback resource.

4. The client device of claim 3, wherein operations to verify that the second device is authorized to notify the client device of the update to the resource includes use of a secure resource manager to evaluate an access control list (ACL) policy.

5. The client device of claim 3, wherein operations to verify that the second device is authorized to notify the client device of the update to the resource include operations to request access information from an Access Management Service (AMS).

6. The client device of claim 5, wherein the second device is an Open Connectivity Foundation (OCF) device acting as a server to the client device and wherein the AMS operates within an OCF onboarding tool or within an OCF generalized client.

7. The client device of claim 1, wherein operations to receive the notification from the second device include operations to receive the notification over a secure session established between the second device and the client device.

8. The client device of claim 1, wherein the notification from the second device includes a RESTful UPDATE command or a RESTful NOTIFY command.

9. The client device of claim 1, further comprising operations to:
release the callback resource, stored at the client device;
remove the second device from the list of notification servers;
receive a second notification from the second device, the second notification including a second update to the resource; and
send a response to the second device indicating that the second device is not in a list of notifiers at the client device in response to the second notification.

10. The client device of claim 1, wherein the resource represents a sensor or an actuator.

11. A device for notifying a client device of an update to a resource comprising:
processing circuitry; and
a memory device including instructions embodied thereon, wherein the instructions, which when executed by the processing circuitry, configure the processing circuitry to perform operations to:
receive an observe request from the client device for the resource;
verify that the client device is permitted to observe the resource;
in response to successful verification of the client device, add the client device as an observer for the resource;
determine the update to the resource has occurred; and
notify the client device of the update to the resource, wherein the notification is used by the client device to apply the update to a callback resource maintained and stored at the client device, wherein the update to the callback resource is used to mirror the resource based on the notification.

12. The device of claim 11, wherein the observe request includes a OBSERVE command implemented as part of a set of RESTful commands.

13. The device of claim 11, wherein operations to verify that the client device is permitted to observe the resource includes use of a secure resource manager to evaluate an access control list (ACL) policy.

14. The device of claim 13, wherein operations to verify that the client device is permitted to observe the resource include operations to request access information from an Access Management Service (AMS).

15. The device of claim 14, wherein the device is an Open Connectivity Foundation (OCF) device acting as a server to the client device and wherein the AMS operates within an OCF onboarding tool or within an OCF generalized client.

16. The device of claim 11, wherein operations to notify the client device include operations to notify the client device over a secure session established between the device and the client device.

17. The device of claim 11, wherein operations to notify the client device include operations to send a RESTful UPDATE command or a RESTful NOTIFY command.

18. The device of claim 11, further comprising operations to, before notifying the client device, re-verify that the client device is permitted to observe the resource.

19. The device of claim 11, further comprising operations to:
receive a response from the client device indicating that the device is not in a list of notifiers at the client device in response to the notification of the update; and
remove the client device from a list of observers of the resource.

20. A method, comprising a plurality of operations executed with a processor and memory of a client device, the method comprising:
receiving notification of observe permission for a resource;
instantiating a callback resource maintained and stored at the client device, the callback resource corresponding to the resource, wherein the callback resource includes control policies corresponding to the resource;
sending an observe request to a second device for the resource;
adding the second device to a list of notification servers maintained at the client device;
receiving a notification from the second device, the notification including an update to the resource; and
updating the callback resource, stored at the client device, to mirror the resource based on the notification.

21. The method of claim 20, wherein the observe request includes an OBSERVE command implemented as part of a set of RESTful commands.

22. The method of claim 20, further comprising verifying that the second device is authorized to notify the client device of the update to the resource before updating the callback resource.

23. The method of claim 22, wherein verifying that the second device is authorized to notify the client device of the update to the resource includes using a secure resource manager to evaluate an access control list (ACL) policy.

24. The method of claim 22, wherein verifying that the second device is authorized to notify the client device of the update to the resource includes requesting access information from an Access Management Service (AMS).

25. The method of claim 20, further comprising:
- releasing the callback resource, stored at the client device;
- removing the second device from the list of notification servers;
- receiving a second notification from the second device, the second notification including a second update to the resource; and
- sending a response to the second device indicating that the second device is not in a list of notifiers at the client device in response to the second notification.

* * * * *